United States Patent
Horie et al.

(10) Patent No.: US 7,555,199 B2
(45) Date of Patent: Jun. 30, 2009

(54) RECORDING APPARATUS, OSD CONTROLLING METHOD, PROGRAM, AND RECORDING MEDIUM

(75) Inventors: Masahiro Horie, Yamaguchi (JP); Youichi Yamamoto, Hiroshima (JP)

(73) Assignee: Panasonic Corporation, Osaka (JP)

( * ) Notice: Subject to any disclaimer, the term of this patent is extended or adjusted under 35 U.S.C. 154(b) by 1229 days.

(21) Appl. No.: 10/756,349

(22) Filed: Jan. 14, 2004

(65) Prior Publication Data

US 2004/0156620 A1 Aug. 12, 2004

(30) Foreign Application Priority Data

Jan. 16, 2003 (JP) ............... 2003-008687

(51) Int. Cl.
*H04N 5/76* (2006.01)
(52) U.S. Cl. ............ 386/83; 386/109; 386/124; 386/95; 386/111; 386/96; 386/45
(58) Field of Classification Search .......... 386/45, 386/95, 96, 111, 124, 83
See application file for complete search history.

(56) References Cited

U.S. PATENT DOCUMENTS

| 6,434,554 B1* | 8/2002 | Asami et al. ............... 707/4 |
| 7,379,655 B1* | 5/2008 | Koyabu et al. ............ 386/52 |
| 7,386,223 B2* | 6/2008 | Yagi et al. ................ 386/124 |
| 2002/0166123 A1* | 11/2002 | Schrader et al. .......... 725/58 |

FOREIGN PATENT DOCUMENTS

JP 10-191463 7/1998

* cited by examiner

*Primary Examiner*—Thai Tran
*Assistant Examiner*—Helen Shibru
(74) *Attorney, Agent, or Firm*—Wenderoth, Lind & Ponack, L.L.P.

(57) ABSTRACT

A recording apparatus having a TS obtaining unit that obtains a transport stream including video data and data broadcast content; a BML generating unit that generates state information in which a user interface screen showing in what state the apparatus is in as a result of a user's operation is described by a description method used to describe the data broadcast content; and a re-multiplexing unit that multiplexes the state information onto the transport stream.

13 Claims, 24 Drawing Sheets

FIG.7

```
<?xml version="1.0" encoding="EUC-jp" ?>
<!DOCTYPE bml PUBLIC "+//ARIB STD-B24:1999//DTD BML Document//JA" "bml_1_0.dtd">
<?bml bml-version="1.0" ?>
<bml>
<head>
<title>RECORD/REPLAY MODE</title>
<style>
<![CDATA[
p{background-color-index:2}
#plain{top:0px; left:0px; width:960px; height:540px;
        background-color-index:4}
#menu1 {top:100px; left:200px; width:50px; height:500px;
        nav-index:0; nav-up:1; nav-right:1; nav-down:1; nav-left:1;}
#menu2{top:200px; left:200px; width:50px; height:500px;
        nav-index:1; nav-up:0; nav-right:0; nav-down:0; nav-left:0;}
```
⎫
⎬ ~1
⎭

```
]]>
</style>

<script>
<![CDATA[
function showMovie() {#AVC COMMAND(REPLAY)ISSUING PROCESS#}  ~3
function hideMovie() {#AVC COMMAND(HALT)ISSUING PROCESS#}    ~4
]]>
</script>
</head>
```
⎫
⎬ ~2
⎭

```
<body style="resolusion:960x540;">
<div style="top:0px; left:0px; width:960px; height:540px">

<object id="video/X-arib-mpeg2" data="arib://-1.-1.-1/-1"
  style="top:30px;left:300px;width:600px;height:337px;
visibility:hidden;">
</object>
</div>
```
⎫
⎬ ~5
⎭

```
</body>
</bml>
```

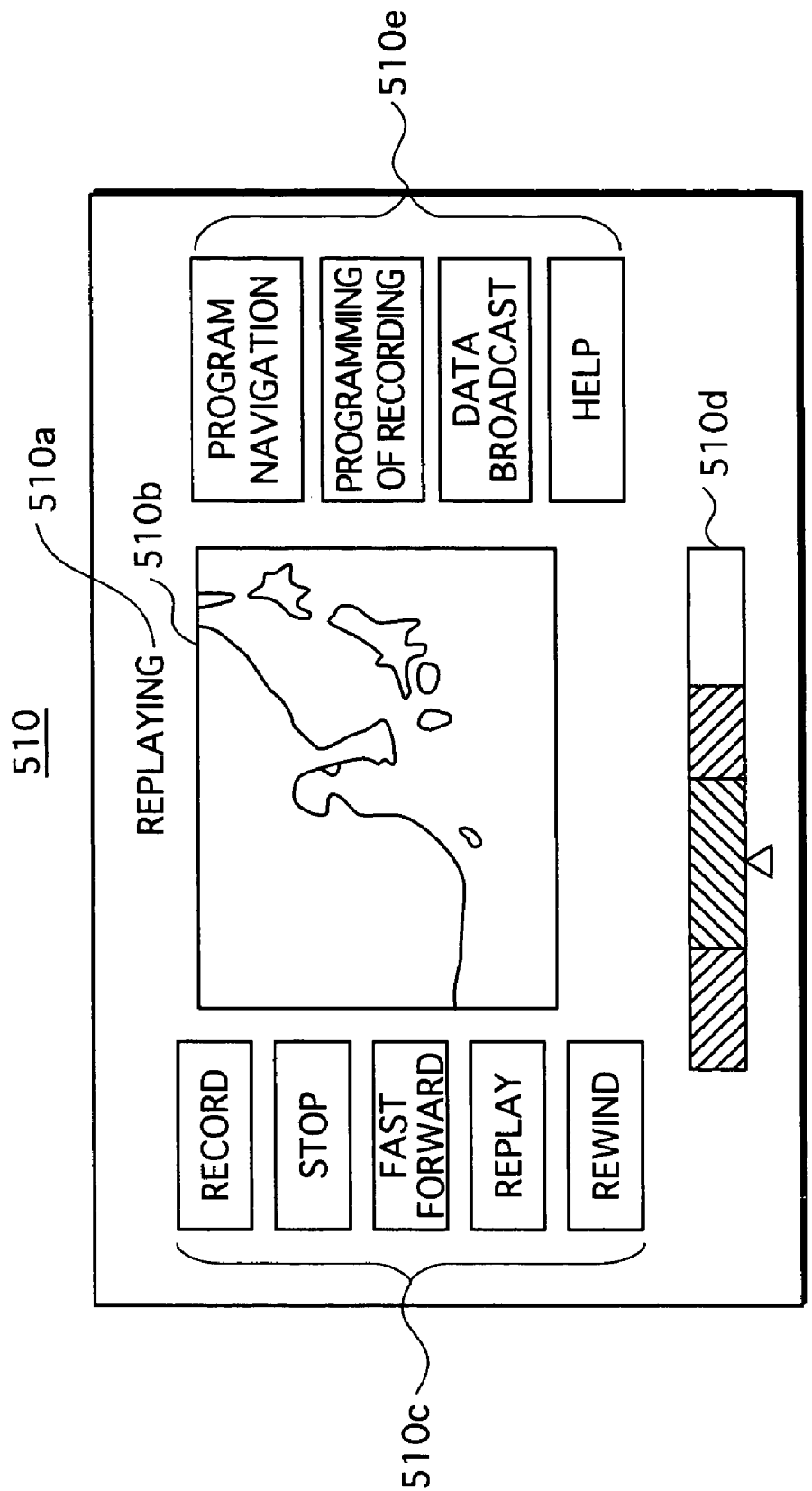

OPERATION GUIDANCE

HOW TO USE PROGRAM NAVIGATION
1. CONTENTS DISPLAY --------
-------- 540a

BACK
540b

RECORDING APPARATUS, OSD CONTROLLING METHOD, PROGRAM, AND RECORDING MEDIUM

BACKGROUND OF THE INVENTION

1. Field of the Invention

The present invention relates to recording apparatuses, particularly to a technique to display, by OSD (On Screen Displays), GUI (Graphical User Interface) screens that are unique to recording apparatuses.

2. Description of the Related Art

Some recording apparatuses show the operational state they are in with the use of a technique called OSD, which is to display, on a display device connected thereto, a GUI screen unique to each recording apparatus.

The Japanese Unexamined Patent Application Publication No. 10-191463 discloses a technique to have one device display a screen for controlling another device when a plurality of devices are connected with each other via a network such as a LAN.

A conventional recording apparatus for recording analogue broadcast is able to perform OSD by superimposing GUI screen data of analogue signals on video data which are analogue signals according to the NTSC (National Television System Committee) method or the like, and transmitting them to a display device. As for digital broadcast, however, encoded digital signals are used as video data; therefore, a recording apparatus is not able to simply superimposing GUI screen data on video data which are encoded digital signals.

In order to display, by OSD, by superimposing an image unique to the recording apparatus on video data which are encoded digital signals, it is required to decode the encoded video data, and further to convert digital signals into analogue signals, and then to superimpose the image unique to the recording apparatus on the video data of analogue signals.

Display devices including digital TVs that are able to decode encoded video data have become popular, however. If display devices have built-in decoders, recording apparatuses do not need to have built-in decoders and their prices can stay low. Recording apparatuses tend to specialize in a function as a streamer which is to record (accumulate) video data received via digital broadcast and transmit the data while having them remain as digital data to a display device via a cable in accordance with the IEEE 1394 standard, which is for digital connections.

Recording apparatuses that do not include a decoder therein have a problem of not being able to use a technique to decode encoded digital signals and superimpose a GUI screen unique to each recording apparatus.

Further, as for digital broadcast, data broadcast is offered along with video data broadcast, and also a plurality of pieces of video data are multiplexed and broadcasted. Such video data have a data structure that allows a link between video and data broadcast, as well as multi-view programs which are peculiar to digital broadcast. When video data are converted to analogue signals, such data structures will be unavailable. If analogue signals are transmitted to a display device without such a data structure, there is a problem that the display device is not able to offer multi-view programs and the like.

SUMMARY OF THE INVENTION

In view of the aforementioned problems, an object of the present invention is to provide a recording apparatus that is able to, without having the video data of digital broadcast decoded, display on a display device, by OSD, images unique to the recording apparatus, an OSD controlling method, a program therefor, and a recording medium therefor.

In order to achieve the object, the present invention provides a recording apparatus comprising: an obtaining unit operable to obtain a transport stream including video data and a data broadcast content; a receiving unit operable to receive a user's operation; a read/write unit operable to perform a writing process of writing the transport stream to a recording medium and a reading process of reading the transport stream from the recording medium, according to the user's operation; a generating unit operable to, with use of a description method used for describing the data broadcast content, generate state information indicating in what state the recording apparatus is as a result of the user's operation; and an outputting unit operable to output the generated state information to a display device via a digital interface.

With this arrangement, the recording apparatus of the present invention is able to transmit, to the display device, the state information that can be put into graphics at the display device and is described in the method by which the data broadcast content is described.

Accordingly, it is possible to display, at the display device, by OSD, a screen showing a response to a user's operation, using a function of putting the data broadcast content into graphics. Further, in order to display by OSD, there is no need to decode or convert to analogue signals, the video data of digital broadcast; therefore, it is possible to utilize multi-view programs or data broadcast which are services peculiar to digital broadcast, and also even when the recording apparatus does not include a decoder, it is possible to display on the display device, by OSD, in what state the apparatus is as a result of the user's operation.

It is also acceptable to have an arrangement wherein the display device is operable to display graphic user interfaces, and the state information includes a control instruction to control a graphic user interface for at least receiving the user's operation.

With this arrangement, the recording apparatus is able to control the receiving of the user's operation via the graphic user interface displayed by the display device.

It is also acceptable to have an arrangement wherein the description method is to describe in one of a markup language and a machine-independent bytecode language.

With this arrangement, it is possible to describe, in one of a markup language and a machine-independent byte code language, the user interface screen indicating in what state the recording apparatus is as a result of the user's operation, and output it to the display device.

Thus, it is possible to put the user interface screen into graphics with the browser included in the display device.

Further, it is acceptable to have an arrangement wherein the state information is a user interface screen description document and includes a hyper link to the data broadcast content.

With this arrangement, it is possible to make a shift between screens, with the use of the hyper link, from the user interface screen showing in what state the recording apparatus is as a result of the user's operation to the data broadcast content.

Thus, it is possible to selectively display the user interface screen and the data broadcast content, without having to change the existing layout of the screen for the data broadcast content.

It is also acceptable that the recording apparatus further comprises a link attaching unit operable to attach a hyper link to the data broadcast content, wherein the state information is a user interface screen description document and is a link destination of the hyper link.

With this arrangement, it is possible to make a shift between screens, with the use of the hyper link, from the data broadcast content to the user interface screen showing in what state the recording apparatus is as a result of the user's operation.

Thus, by operating on the display device, the user is able to selectively display the user interface screen and the data broadcast content.

It is also acceptable to have an arrangement wherein the outputting unit outputs, to the display device, along with the state information, an application that is described in a machine-independent bytecode language and is for putting the state information into graphics.

With this arrangement, it is possible to describe the state information with a data structure that allows the state information to be put into graphics by the application described in a machine-independent bytecode language and to output, to the display device, the application along with the state information.

Thus, it is possible to put into graphics, the user interface screen showing in what state the recording apparatus is as a result of the user's operation, due to the application operated by the application executing engine included in the display device.

Further, it is acceptable to have an arrangement wherein the generating unit includes a storing subunit and an apparatus information extracting subunit, the storing subunit storing therein layout information in which a layout of a user interface screen is described in a markup language and the apparatus information extracting subunit being operable to obtain apparatus information indicating in what state the recording apparatus is as a result of the user's operation, and the generating unit generates the state information by obtaining the layout information from the layout storing subunit and rewriting the layout information according to the state indicated in the apparatus information.

With this arrangement, the recording apparatus is able to easily generate the state information using the layout information which provides a format.

Thus, it is possible to display, by OSD and in a layout unique to the apparatus, the user interface screen showing in what state the recording apparatus is as a result of the user's operation, regardless of what is transported in the transport stream obtained by the obtaining unit.

It is further acceptable to have an arrangement wherein the apparatus information is one of or a combination of any of (i) function mode information indicating an operational state of the recording apparatus, (ii) function operation information being explanation on how to operate the user interface screen, (iii) media information indicating in what state the recording medium is, including a remaining recording capacity of the recording medium, (iv) content information indicating in what state the transport stream is, including an amount of transport stream data having been recorded on the recording medium, (v) replay mode information indicating a position of reading with respect to an entire length of the TS being read, and (vi) recording mode information indicating a position of writing with respect to an entire length of the TS being written.

With this arrangement, since various types of information are included, the user interface screen, which shows in what state the recording apparatus is as a result of the user's operation, is able to accurately show the state of the recording apparatus.

It is acceptable to have an arrangement wherein the receiving unit receives operation information indicating the user's operation from the display device via the digital interface.

With this arrangement, the user is able to operate the recording apparatus through the display device he/she uses for the viewing, and also to confirm, on the display device, the state information which is generated by the recording apparatus in accordance with the user's operation.

Thus, the user does not have to operate the recording apparatus directly, even when the recording apparatus and the display device are installed in two different rooms.

It is also acceptable to have an arrangement wherein the outputting unit outputs the state information to the display device by incorporating the state information into the data broadcast content.

With this arrangement, it is possible to incorporate the state information into the data broadcast content included in the transport stream and to transmit it to the display device.

Thus, in order to display by OSD, there is no need to decode or convert to analogue signals, the video data of digital broadcast included in the transport stream; therefore, it is possible to utilize multi-view programs or data broadcast which are services peculiar to digital broadcast, and also even when the recording apparatus does not include a decoder, it is possible to display on the display device, by OSD, images that are unique to the recording apparatus.

Further, it is acceptable to have an arrangement wherein the data broadcast content is multiplexed onto the transport stream using a data carousel method, and the outputting unit incorporates the state information into the data broadcast content by adding the state information to a data carousel transporting the data broadcast content.

With this arrangement, it is possible to output the state information to the display device using the data carousel method.

Thus, at a timing of the user's choice, after the state information having been transported by the data carousel method is accumulated in the display device, the user is able to put into graphics, the screen showing the state of the apparatus as a result of the user's operation, It is also acceptable to have an arrangement wherein the outputting unit adds the state information to the data carousel by separating the transport stream into a first data carousel and an intermediate transport stream so as to generate a second data carousel from (i) the data broadcast content included in the first data carousel and (ii) the state information, and the outputting unit incorporates the state information into the data broadcast content by, at least, multiplexing the second data carousel and the intermediate transport stream.

With this arrangement, it is possible to transport the state information and the data broadcast content together, by making use of the data carousel used for transporting the data broadcast content. It is possible to multiplex the packets transporting the video data and the packets transporting the data carousel, at a assigned transport speed which is arbitrarily selected from a bandwidth range in which the transport stream is able to transport these packets; therefore, there is no need to change the transport speed at which the video data is transported in order to output the state information to the display device.

Thus, it is possible to display, by OSD, the user interface screen showing the state of the apparatus as a result of the user's operation, without inducing errors in replay images that are caused by delays in the transport of the video data.

Further, it is acceptable to have an arrangement wherein the second data carousel and the intermediate transport stream are multiplexed at a bandwidth that is same as a bandwidth of the transport stream at a stage of being obtained by the obtaining unit.

With this arrangement, it is possible to transport the state information and the data broadcast content together, using the bandwidth at which the transport stream transports the data broadcast content.

Thus, it is possible to multiplex the state information onto the transport stream without exceeding the bandwidth at which the transport stream, as a whole, is able to transport information.

Further, it is possible to have an arrangement wherein the outputting unit incorporates the state information into the data broadcast content by removing the data broadcast content from the transport stream that includes the data broadcast content and the intermediate transport stream, and multiplexing the state information onto the intermediate transport stream.

With this arrangement, it is possible to multiplex the state information after removing the data broadcast content from the transport stream onto which the data broadcast content has been multiplexed. In this case, since only the state information is transported by the data carousel method, it is possible to make the carousel cycle shorter than in a case where the data broadcast content and the state information are transported together by the data carousel method.

Thus, when the user interface screen showing the state of the apparatus as a result of the user's operation needs to be updated according to the shift made in the state of the recording apparatus, it is possible to inhibit a time lag that may be caused between (i) a time at which a new user interface screen is outputted by the recording apparatus and (ii) a time at which the display device is ready to put the new user interface screen into graphics.

It is further acceptable to have an arrangement wherein the transport stream includes a plurality of null packets that have no information to be transported therein, and the outputting unit incorporates the state information into the data broadcast content by replacing the null packets with the state information.

With this arrangement, it is possible to multiplex the state information using a surplus bandwidth in the transport stream.

Thus, it is possible to efficiently multiplex the state information, without exceeding the bandwidth at which the transport stream, as a whole, is able to transport information.

It is further acceptable to have an arrangement wherein the transport stream into which the state information has been incorporated is recorded onto the recording medium by the read/write unit.

With this arrangement, it is possible to record, onto the recording medium, the transport stream onto which the state information is multiplexed. Even when the transport stream recorded on the recording medium is read using a replaying apparatus which does not have a function of display by OSD, it is possible to display, by OSD, the user interface screen showing the state of the apparatus as a result of the user's operation, and to perform replay operations by referring to the user interface screen.

The present invention further provides a recording medium on which a transport stream is recorded, wherein (i) information indicating in what state an apparatus by which the recording medium is to be operated is, as a result of a user's operation and (ii) video data are multiplexed onto the transport stream.

With this arrangement, when the user performs an operation to read the transport stream recorded on the recording medium, using a replaying apparatus that does not have a function of display by OSD, it is possible to display on the display screen, by OSD, the state of the apparatus as a result of the user's operation, because of the information multiplexed onto the transport stream.

Thus, the user is able to perform replay operations by referring to the display by OSD.

The present invention provides an OSD control method comprising: an obtaining step of obtaining a transport stream including video data and a data broadcast content; a receiving step of receiving a user's operation; a read/write step of performing a writing process of writing the transport stream to a recording medium and a reading process of reading the transport stream from the recording medium, according to the user's operation; a generating step of, with use of a description method used for describing the data broadcast content, generating state information indicating in what state the recording apparatus is as a result of the user's operation; and an outputting step of outputting the generated state information to a display device via a digital interface.

The present invention further provides a program that is computer-readable and has a computer execute: an obtaining step of obtaining a transport stream including video data and a data broadcast content; a receiving step of receiving a user's operation; a read/write step of performing a writing process of writing the transport stream to a recording medium and a reading process of reading the transport stream from the recording medium, according to the user's operation; a generating step of, with use of a description method used for describing the data broadcast content, generating state information indicating in what state the recording apparatus is as a result of the user's operation; and an outputting step of outputting the generated state information to a display device via a digital interface.

With this arrangement, it is possible to transmit, to the display device, the state information that can be put into graphics by the display device and is described by the description method by which the data broadcast content is described.

Thus, it is possible to display at the display device, by OSD, the screen showing the response to a user's operation, using a function of putting the data broadcast content into graphics. Further, in order to perform OSD, there is no need to decode or convert to analogue signals, the video data of digital broadcast; therefore, it is possible to utilize multi-view programs or data broadcast which are services peculiar to digital broadcast, and also even when the recording apparatus does not include a decoder, it is possible to display on the display device, by OSD, the state of the apparatus as a result of a user's operation.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 7 is an example of description in the BML file for replayed programs 430;

FIG. 8 shows an example of a main menu screen 510 in which a BML file for main menu 410 has been put into graphics;

FIG. 12 shows an example of a guidance screen 540 in which one of the BML files for guidance 440 has been put into graphics;

DETAILED DESCRIPTION OF THE INVENTION

The following describes embodiments of the present invention, with reference to the drawings, FIGS. 1 to 24.

First Embodiment

General Outline

The recording apparatus 100 of the first embodiment describes a user interface screen (hereafter, it will be referred to as a GUI screen) in BML (Broadcast Markup Language) so as to generate BML files that show state information. The following describes the structure of the recording apparatus 100.

Structure

1. TS (Transport Streams)

Firstly, before explanation on the recording apparatus 100 of the present invention is provided, the general outline of a transport stream (hereafter, referred to as a TS) in digital broadcast to be recorded and replayed by the recording apparatus 100 will be described.

Figure 1:
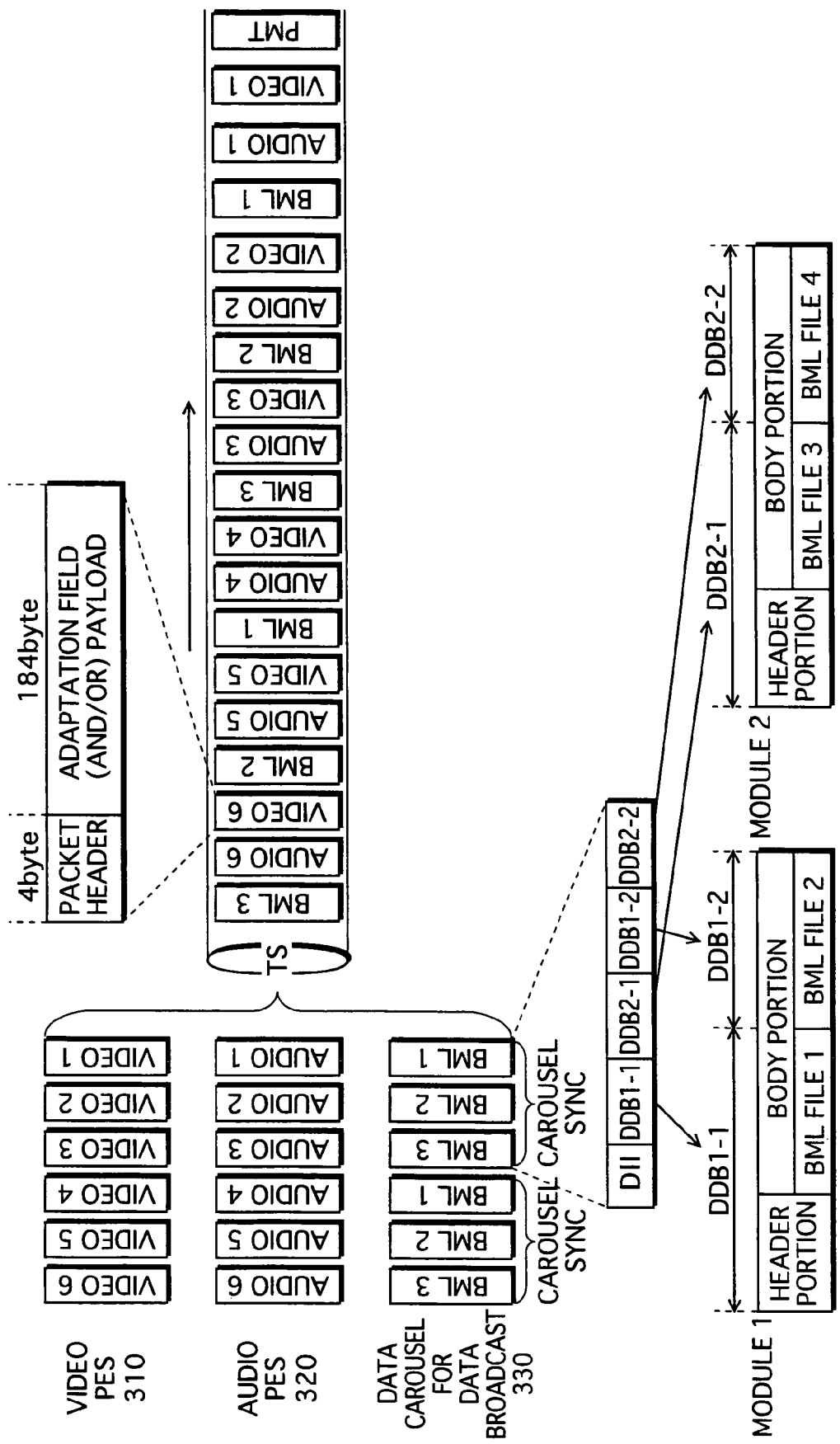
FIG. 1 is a schematic drawing of a TS that transports a broadcast program.

FIG. 1 is a schematic drawing of a TS that transports a broadcast program. The TS is a stream in which TS packets each being a 188-byte fixed length packet are arranged in a sequence, and transmits video PES (Packetized Elementary Stream), audio PES, data carousels for data broadcast, and program specifying information. It should be noted that the program specifying information is, for example, a PMT (Program Map Table) that indicates in which one of the TS packets, video, audio, and data carousels for data broadcast that are constituting the program are divided and stored, and a PAT (Program Association Table) that indicates in which one of the TS packets the PMT is stored. In addition, also multiplexed onto the TS is a TS packet storing therein program data such as a title of a broadcast program to be transported, a position of the program in the TS, and the like. As additional information, in digital broadcast, services such as a multi-view program are offered, in which a plurality of sets of video data, audio data, and data broadcast data are included; however, in this description, the embodiments are explained using the TS on which a video PES 310, an audio PES 320, and a data carousel for data broadcast 330 that each transports one set of video data, one set of audio data, and one set of data broadcast data, respectively, are multiplexed at their individual bandwidths.

A TS packet is made up of a combination of a four-byte fixed length packet header, an adaptation field, and a payload.

In the packet header, information such as a PID (Packet identification) and the like is defined. A packet header is included in every TS packet. As additional information, a PID is a two-byte identifier that identifies the type of a TS packet.

In each of the TS packets that store therein one of the video PES 310, the audio PES 320, and the data carousel for data broadcast 330, a value which is common to each type of data stored is set as a PID. It should be noted that, in the PMT, PIDs of the TS packets that each store therein one of the video PES 310, the audio PES 320, and the data carousel for data broadcast 330 which constitute the program.

The PID of the TS packet storing therein the PAT is "0x0000". In this description, the expression "0x??" indicates that "??" denotes a hexadecimal value.

In a TS packet, sometimes both of an adaptation field and a payload are included and sometimes only one of them is included. An adaptation field is used for transporting information such as the base time and the like and for adjusting the packet size of the TS packet. A payload is a field in which the video PES 320, the audio PES 320, the data carousel for data broadcast 330 and the PMT are divided and stored.

The following explains the data carousel for data broadcast 330 that is to be used for transporting a GUI screen.

The data carousels for data broadcast 330 are units for repeatedly transporting data broadcast contents according to the data carousel method defined by the ISO/IEC 13818-6. In a data carousel for data broadcast 330, DDB (Download Data Blocks) and DII (Download Info Indications) are arranged in a predetermined order. A DDB is a divided section (being equal to or smaller than a predetermined size: 4084 bytes) of a module storing therein a BML file for data broadcast describing a data broadcast content. A DII indicates the number of modules to be transmitted as data carousels for broadcast data 330, information about each module, and the like.

When data carousels for data broadcast 330, in which a data broadcast content is packetized into TS packets, are repeatedly transmitted with predetermined carousel cycles, the display device is able to display a data broadcast screen, at arbitrary timing, in accordance with a user's operations to call for the data broadcast.

It should be noted that, to packetize a data broadcast content into TS packets means to divide a data broadcast content into segments of 184 bytes each, starting from the head of the data broadcast content, and store each segment into the payload of a TS packet, and then attach a four-byte packet header to each payload, so as to store the data broadcast content into TS packets. At the end of a data broadcast content, when there are less than 184 bytes after dividing it into segments, the adaptation field is used to perform stuffing.

A data broadcast content for digital broadcast may include, as data to be stored in the module, BML files, still images (jpeg (Joint Photographic Experts Group), or PNG (Portable Network Graphics)), and audio (AAC-LC (Advanced Audio Coding), AIFF-C (Audio Interchange File Format)), and the like; however, in this description, the embodiments are explained using a data broadcast content in which only BML files are stored in the module.

2. System Structure

The following explains the structure of the record/replay system 1 in which the recording apparatus 100 of the present invention is used.

Figure 2:
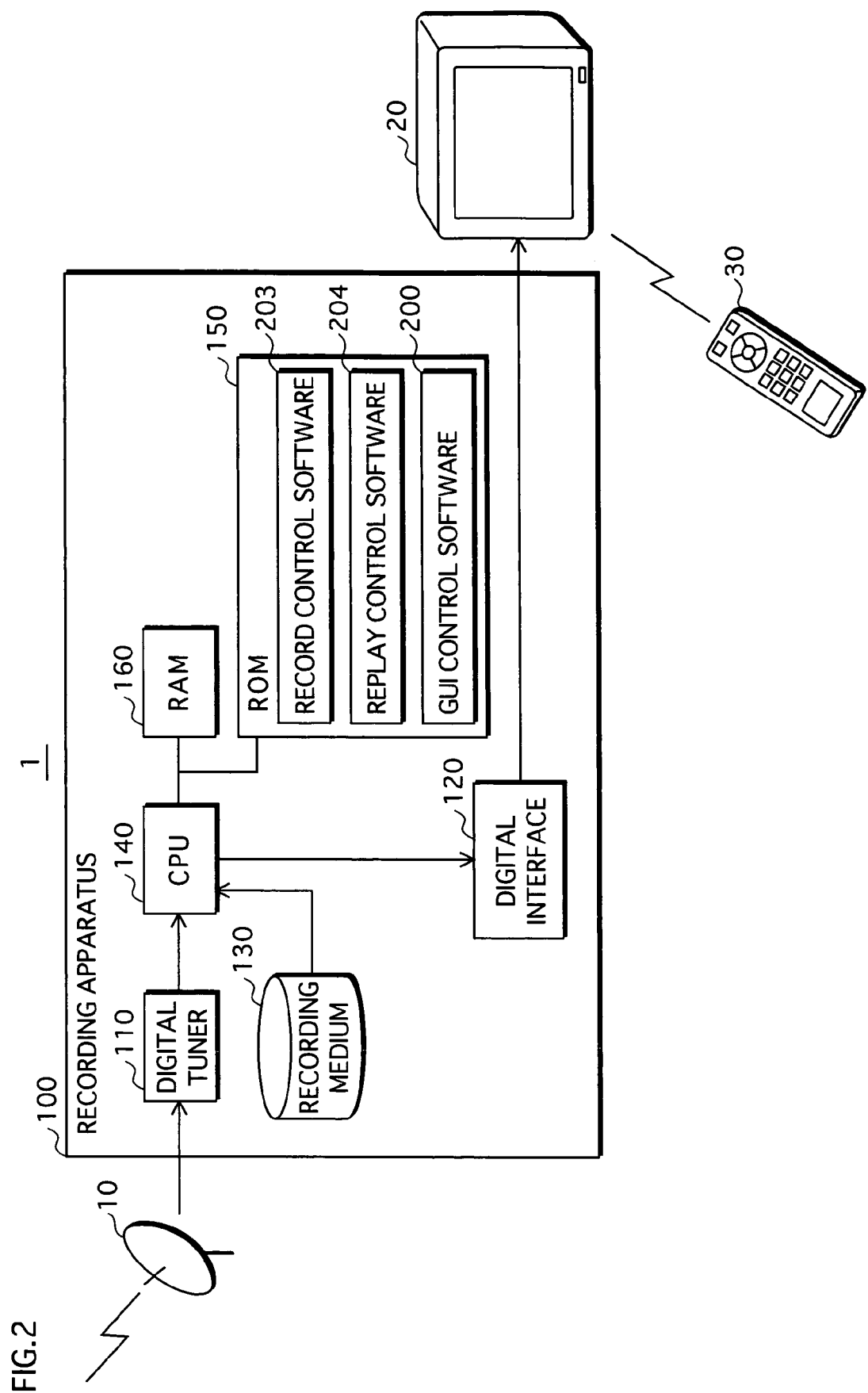
FIG. 2 shows the structure of the record/replay system 1 in which the recording apparatus 100 of the present invention is used.

FIG. 2 shows the structure of the record/replay system 1 in which the recording apparatus 100 of the present invention is used. The record/replay system 1 comprises an antenna 10, a display device 20, a remote controller 30, and the recording apparatus 100.

The antenna 10 is an antenna for receiving TSs in digital broadcast. On each TS received by the antenna 10, (a) television broadcast for multiple channels that include video data and audio data having been encoded by the MPEG-2 standard and (b) data broadcast to accompany the television broadcast are multiplexed.

The display device 20 is a digital TV which is in accordance with the digital broadcast standard defined by the ARIB (Association of Radio Industries and Businesses). The display device 20, which includes an MPEG-2 decoder and a BML browser, provides television broadcast with video and audio and also displays data broadcast by putting it into graphics. Further, the display device 20 is digitally connected to the recording apparatus 100 via a cable according to the IEEE 1394 standard, and has a function of transmitting, to the recording apparatus 100, an AVC command for controlling the devices that are mutually connected via the IEEE 1394 cable. The BML browser included in the display device 20 puts data broadcast into graphics and displays it, when a button to call for data broadcast (hereafter, it will be referred to as "the D button") is pushed on the remote controller 30. More specifically, having received a notification that the D button has been pushed, the BML browser starts the display by putting a BML file for the initial display into graphics, the BML file for the initial display being included in the BML files transmitted by the data carousel method. The BML file for the initial display to be displayed at this time has been transmitted in a TS packet whose component tag defined by the digital broadcast standard is set at a default value, "0x40". The file name of the BML file for the initial display is "startup.bml".

The remote controller 30 is an accompaniment for the display device 20 and is according to the ARIB TGR-15 standard. The remote controller 30 has buttons for selecting a channel as well as the D button, an "Up" button, a "DOWN" button, a "LEFT button", a "RIGHT" button, and a "CONFIRM" button, which are operational buttons related to the present invention.

The recording apparatus 100 is a record/replay device which has a recording function and a replaying function, the recording function being to obtain, at the digital tuner 110, TS for the broadcast program of the recording target out of the TSs received by the antenna 10, and to stream-record the targeted TS onto the recording medium 130, and the replaying function being to read the TS which has been stream-recorded onto the recording medium 130 and to transmit the TS to the display device 20 via the digital interface 120.

3. Recording Apparatus

The following describes the structure of the recording apparatus 100. As the hardware structure, the recording apparatus 100 includes the digital tuner 110, the digital interface 120, the recording medium 130, the CPU 140, the ROM 150, and the RAM 160.

The digital tuner 110, which is an obtaining unit, obtains the TS that transports the channel desired by the user, out of the TSs received at the antenna 10.

The digital interface 120 is a constituent element that controls the data inputs and outputs according to the IEEE 1394 standard. The digital interface 120 outputs a TS to the display device 20, and also has a function as a receiving unit, which is to receive the user's operations based on the AVC commands from the display device 20.

The recording medium 130 is a recording medium on which and from which the TSs of the programs broadcasted by digital broadcast can be recorded and read. Specifically, the recording medium 130 may be a DVD-RAM, an HDD, or the like. The recording medium 130 has management information for managing the recording capacity, the remaining recording capacity, and the like. For each of the programs being recorded, the used capacity (recording period), the date and time of the recording, the recording mode (record bit rate), the channel, and the like are managed by the management information.

The CPU 140 reads and executes the record control software 203/the replay control software 204, that are stored in the ROM 150 and thereby functions as a read/write unit that controls the processing of writing TSs to the recording medium 130 and reading TSs from the recording medium 130.

The CPU 140 reads and executes the GUI control software 200 stored in the ROM 150, and thereby it is possible to display a GUI screen by OSD, which is an object to be achieved by the present invention.

4. Software Structure

The following describes in detail the GUI control software 200 for controlling OSD of a GUI screen, which is an object to be achieved by the present invention.

Figure 3:
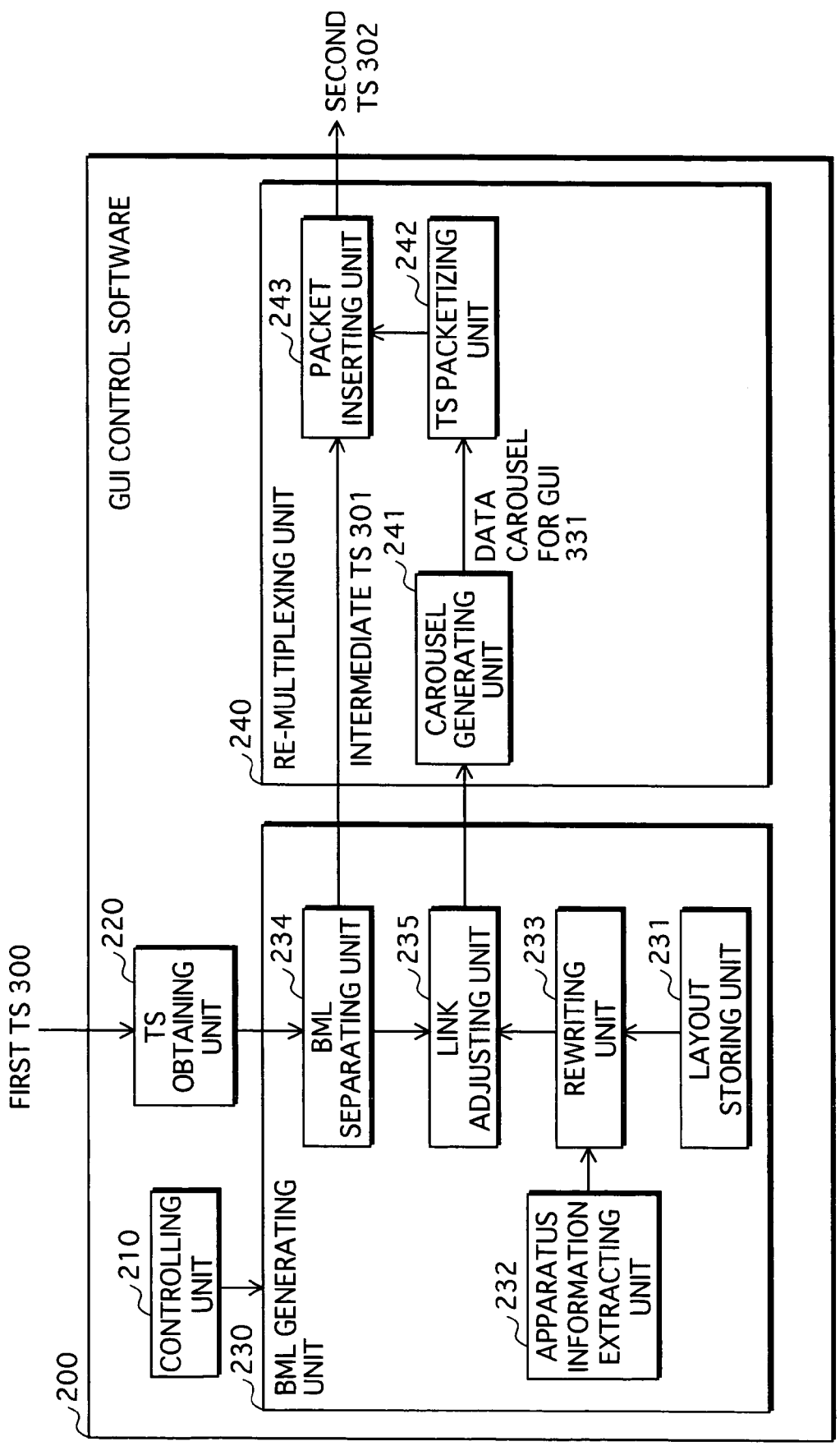
FIG. 3 is a block diagram showing the functional structure of the GUI control software 200 that controls OSD of a GUI screen.

FIG. 3 is a block diagram showing the functional structure of the GUI control software 200 that controls OSD of a GUI screen. The GUI control software 200 has the CPU 140 execute the processes of (i) generating a user interface screen description document that describes a GUI screen in BML and (ii) multiplexing the user interface screen description document being a BML file onto a TS. The GUI control software 200 includes functional blocks such as a controlling unit 210, a TS obtaining unit 220, a BML generating unit 230, and a re-multiplexing unit 240.

4.1 Controlling Unit

Figure 4:
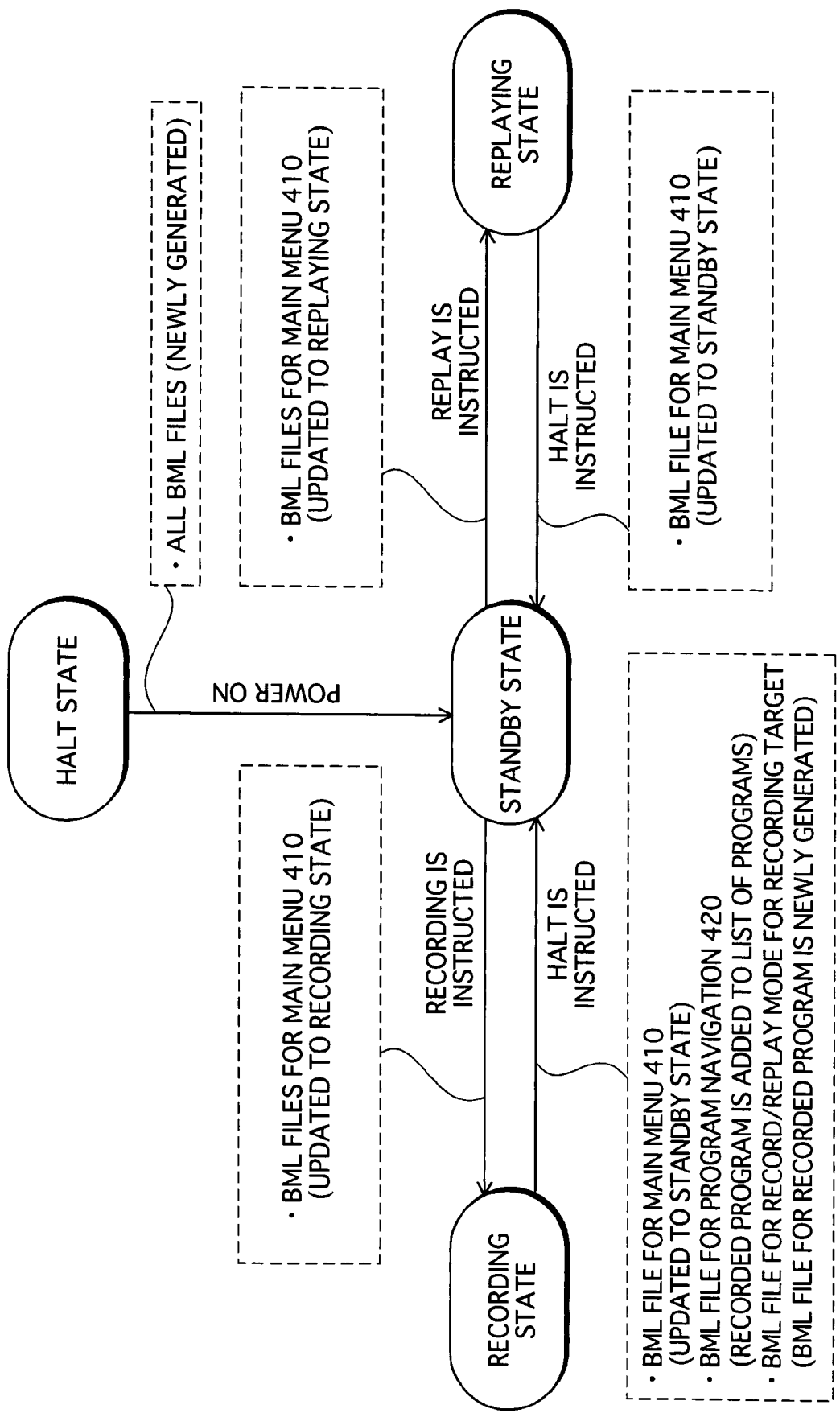
FIG. 4 shows the relationship between (a) the shifts between the operational states and (b) primary examples of the BML files to be updated when the state shifts.

When the operational state of the recording apparatus 100 changes as a result of the user's operation received at the digital interface 120, the controlling unit 210 instructs the BML generating unit 230 to update the GUI data 400, which are BML files each of which describes a different one of the plurality of kinds of GUI screens. It should be noted that the changes in the operational state of the recording apparatus 100 which require an update of the GUI data 400 are made when the power of the recording apparatus 100 is turned on and when the recording apparatus 100 shifts between the recording state, the replay state, and the standby state. FIG. 4 shows the relationship between (a) the shifts between the operational states and (b) primary examples of the BML files to be updated when the state shifts.

When the power of the recording apparatus 100 is turned on, all the BML files constituting the GUI data 400 are newly generated.

When a shift is made from the standby state to the recording state, the BML file for main menu 410 is updated to a BML file for the recording state, in which only the halt operational menu is operational.

When a shift is made from the recording state to the standby state, (i) the BML file for main menu 410 is updated to a BML file for the standby state, in which only the record operational menu is operational, (ii) the BML file for program navigation 420 is updated to a BML file in which the broadcast program being the recording target is added to a list of the programs, and (iii) a BML file for a replayed program 430 of the recording target is newly generated.

When a shift is made from the standby state to the replay state, the BML file for main menu 410 is updated to a BML file for the replay state, in which the operational menus for halt, fast forward, replay, and rewind are operational.

When a shift is made from the replay state to the standby state, the BML file for main menu 410 is updated to a BML file for the standby state, in which only the record operational menu is operational.

4.2 TS Obtaining Unit

The TS obtaining unit 220 shown in FIG. 3 obtains a TS for display (the first TS 300) according to the operational state of the recording apparatus 100, and outputs the obtained first TS 300 to the BML generating unit 230. It should be noted that the TS for display is a TS that has been read from the recording medium 130 when the recording apparatus 100 is in the middle of replay, whereas it is a TS that has been outputted by the digital tuner 110 when the recording apparatus 100 is in other states.

4.3 BML Generating Unit

The BML generating unit 230, which is a generating unit operable to generate state information, includes the layout storing unit 231, the apparatus information extracting unit 232, the rewriting unit 233, the BML separating unit 234, and the link adjusting unit 235. The BML generating unit 230 generates BML files for GUI each of which describes a GUI screen in BML, and outputs the generated BML files for GUI to the re-multiplexing unit 240.

The layout storing unit 231 stores therein a plurality of layout files in each of which a format for a GUI screen is described in BML. In each layout file, the description portion, which changes according to the state of the recording apparatus 100, is written with inconstant values. For example, as for the menu which can be highlighted when the recording apparatus 100 is in the replay state and cannot be highlighted when the recording apparatus 100 is in a state other than the replay state, the description portion of the menu that is in the layout file and indicates if the menu can be highlighted or not is written with inconstant values.

The apparatus information extracting unit 232 obtains, according to an instruction from the controlling unit 210, apparatus information indicating in what state the recording apparatus 100 is. The apparatus information includes, function mode information, function operation information, media information, content information, replay mode information, and recording mode information.

The function mode information indicates in what state the recording apparatus 100 is currently: recording, replaying, or standing by. This information is obtained from the record control software 203 and the replay control software 204 that control recording and replay, respectively.

The function operation information is a guidance document that shows how to operate the GUI and is stored in the ROM 150 in a text format.

The media information indicates the type of each medium constituting the recording medium 130 (e.g. a DVD-RAM, an HDD, or the like), the recording capacity, the usable capacity (remaining recording capacity), the total number of recorded programs, the total used capacity with recorded programs (the total recording period), the disc name, and the protect setting of the medium. This information is obtained out of the management information stored in the recording medium 130.

The content information includes, for each of the programs recorded on the recording medium 130, the used capacity (recording period), the date and time of the recording, the recording bit rate, the channel, the program title, the protect setting of the program, and a still image representing the program. These pieces of information are obtained out of the management information of each program which is stored in the recording medium 130, and the still image is obtained from each program stored on the recording medium 130. As additional information each still image representing a program may be an image at the beginning of a program, or may be some other images.

The replay mode information indicates a program ID and a replay time code (a position of reading with respect to an entire length of the TS being read) of a program being a replay target. This information is obtained during a replay process, according to an instruction from the controlling unit 210, out of the program data of the TS being replayed.

The recording mode information indicates a program ID and a recording time code (a position of writing with respect to an entire length of the TS being written) of a program being a recording target. This information is obtained during a recording process, according to an instruction from the controlling unit 210, out of the program data of the TS being recorded.

The rewriting unit 233 obtains, from the layout storing unit 231, a layout file that corresponds to the BML file, the generation of which is instructed by the controlling unit 210, and rewrites the description portion, which is written with inconstant values, of the obtained layout file, based on the apparatus information obtained from the apparatus information extracting unit 232, so as to generate a BML file. The rewriting unit 233 then outputs the generated BML file to the link adjusting unit 235. When the obtained apparatus information includes a still image file that is related to the BML file, the still image file is also outputted to the link adjusting unit 235 along with the BML file generated.

The BML separating unit 234 separates a TS packet storing therein the data carousel for data broadcast 330 from the first TS 300 obtained from the TS obtaining unit 220 and outputs an intermediate TS 301, which transports video PES 310, audio PES 320, and program specifying information, to the re-multiplexing unit 240. At the same time, the BML separating unit 234 notifies, to the re-multiplexing unit 240, the frequency level at which the TS packet storing therein the data carousel for data broadcast 330 is included in the first TS 300.

Also, the BML separating unit 234 obtains, out of the separated TS packet, a BML file for data broadcast in which a data broadcast content is described, and outputs the obtained BML file for data broadcast to the link adjusting unit 235, when there is a change in one or both of the module ID and the module version that have been set with the module in the data carousel for data broadcast 330.

The link adjusting unit 235 stores, in the RAM 160, (i) the GUI data 400 which includes the BML files and the still image file obtained from the rewriting unit 233 and (ii) the BML file for data broadcast obtained from the BML separating unit 234. When any of the BML file for data broadcast and BML files constituting the GUI data 400 is updated, the link adjusting unit 235 adjusts the links of the BML file for data broadcast and the GUI data 400, and outputs, to the re-multiplexing unit 240, those files whose links have been adjusted. It should be noted that adjusting the links of the BML file for data broadcast and the GUI data 400 means (i) to change the file name of the BML file for the initial display included in the BML file for data broadcast from "startup.bml" to "starup2.bml", and also (ii) to set the link destination of the hyperlink to the aforementioned BML file for the initial display of data broadcast described in the BML file for data broadcast and the link destination of the hyperlink to the data broadcast described in the BML files constituting the GUI data 400 obtained from the rewriting unit 233 to be the BML file for the initial display of data broadcast ("starup2.bml"). As additional information, needless to say, the file name of the BML file for the initial display of data broadcast after the change does not need to be the one mentioned above; it is acceptable to have another name as long as it is not the same as the names of other BML files.

In the present embodiment, when a user pushes the D button on the remote controller 30, the initial display screen of the GUI of the recording apparatus 100 will be displayed on the display device 20; however, the present invention may be achieved in another embodiment. For example, it is acceptable to have an arrangement wherein the link adjusting unit 235 (i) changes the file name of the BML file in which the initial display screen of the GUI is described from "startup.bml" to "startup2.bml", (ii) sets the aforementioned link destination of the hyperlink to the initial display screen of the GUI, which is described in the BML files constituting the GUI data 400, to be the BML file in which the aforementioned initial display screen of the GUI is described ("startup2.bml"), and also (iii) adds a description, which is written in BML, for a link button to a GUI screen of the recording apparatus 100 to the BML file for data broadcast obtained from the BML separating unit 234. With this arrangement, when the D button is pushed on the remote controller 30, a normal data broadcast screen will be displayed on the display device 20, as an initial display.

4.4 Re-Multiplexing Unit

The re-multiplexing unit 240, which functions so that the state information is incorporated into data broadcast content, includes a carousel generating unit 241, a TS packetizing unit 242, and a packet inserting unit 243, and re-multiplexes BML files outputted by the BML generating unit 230 and the TS.

The carousel generating unit 241, which functions so that the state information is added to a data carousel, modularizes the obtained GUI data 400 and the BML file for data broadcast, so as to generate DII which is management information for the module and DDB which is the module divided into pieces of a predetermined size. The carousel generating unit 241 further generates a data carousel for GUI 331 by arranging the generated DDB and DII, and outputs it to the TS packetizing unit 242.

The TS packetizing unit 242 packetizes the data carousel for GUI 331 into a TS. The TS packetizing unit 242 sets, as the PID of each TS packet to be generated, a value that is designated by PMT as a PID of a TS packet storing therein the data carousel for data broadcast 330.

The TS packets having been generated will be stored in the RAM 160 until new BML files are outputted by the BML generating unit 230 and the data carousel for GUI 331 is updated by the carousel generating unit 241.

The packet inserting unit 243 obtains, from the RAM 160, the TS packets into which the data carousel for GUI 331 has been divided and stored and generates the second TS 302 that transports the video PES 310, the audio PES 320, the data carousel for GUI 331, and the program specifying information, by multiplexing the obtained TS packets onto the intermediate TS 301.

Here, the packet inserting unit 243 inserts the TS packets storing therein the data carousel for GUI 331 into the intermediate TS 301 at the frequency level notified by the BML separating unit 234, in other words, at the frequency level at which the TS packets storing therein the data carousel for data broadcast 330 are included in the first TS 300. With this arrangement, the data carousel for GUI 331 has a longer carousel cycle than the data carousel for data broadcast 330; however, this way, the second TS 302 having been outputted from the packet inserting unit 243 is able to transport the data carousel for GUI 331 at the bandwidth at which the data carousel for data broadcast 330 is transported by the first TS 300.

Figure 5:
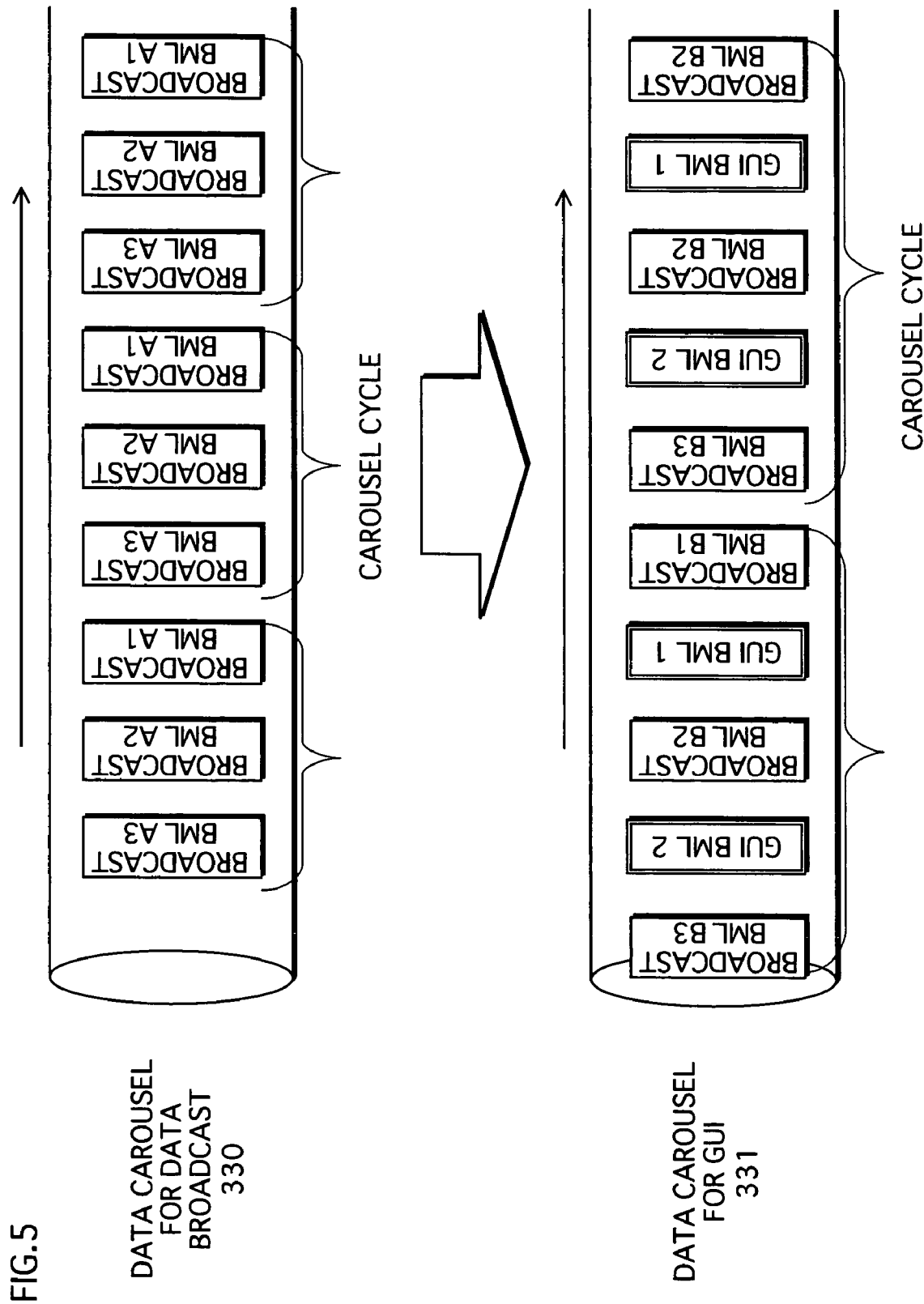
FIG. 5 is a schematic drawing that shows the carousel cycles of the data carousel for data broadcast 330 and the data carousel for GUI 331.

FIG. 5 is a schematic drawing that shows the carousel cycles of the data carousel for data broadcast 330 and the data carousel for GUI 331. The data carousel for data broadcast 330 includes TS packets (the broadcast BMLs A1 to A3) which are packetized BML files for data broadcast in which a data broadcast content is described. The data carousel for GUI 331 includes (i) TS packets (The GUI BMLs 1 and 2) which are packetized BML files for the GUI data 400 in which GUI screens are described, and (ii) TS packets (the broadcast BMLs B1 through B3) which are packetized BML files for data broadcast whose file names have been changed by the link adjusting unit 235.

The data carousel for GUI 331 is transported at the bandwidth (the number of packets transported within a unit of time) that is same as the one at which the data carousel for data broadcast 330 is transported, but since the carousel cycle is arranged to be longer, the data carousel for GUI 331 is able to transport a larger amount of data than the data carousel for data broadcast 330.

With the arrangements that have been mentioned so far, the GUI control software 200 is able to multiplex the BML file in which a GUI screen is described onto a TS.

The second TS 302 generated is to be outputted by the digital interface unit 120 to the display device 20. When the second TS 302 is inputted thereto, the display device 20 is able to display a GUI screen in the same manner as the one used for displaying the data broadcast screen.

Alternatively, it is also acceptable to arrange the recording apparatus 100 of the present invention so that the second TS generated at the re-multiplexing unit is written to a recording medium by the recording control software 203. With this arrangement, even if the recording medium on which the abovementioned TSs are written is read using a replaying apparatus that does not have an OSD function, it is possible to display a GUI screen by OSD.

5. BML Files

Figure 6:
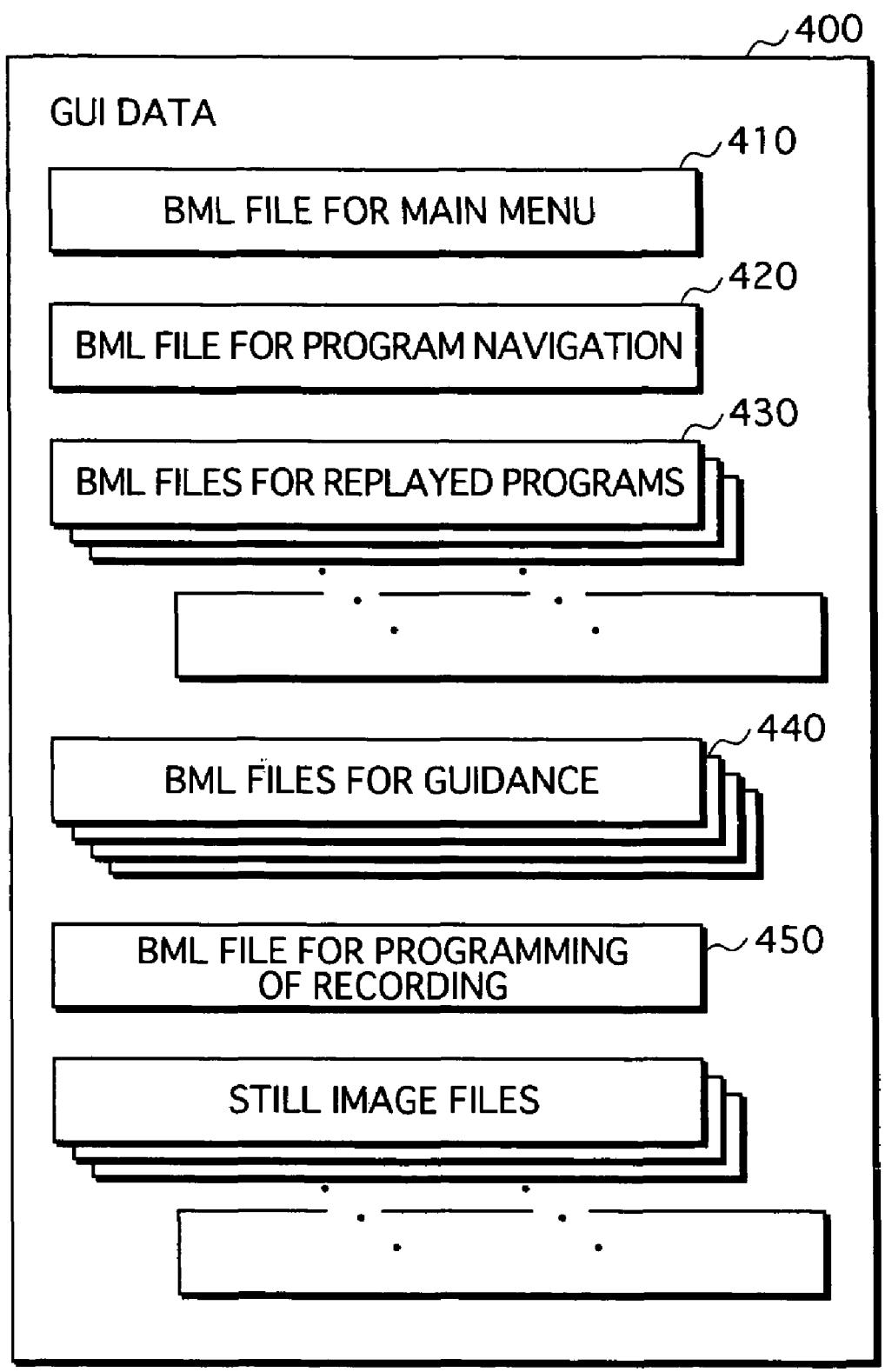
FIG. 6 shows the structure of the GUI data 400 that is generated by the recording apparatus 100.

The following describes the details of the BML files for GUI that are described by the recording apparatus 100. FIG. 6 shows the structure of the GUI data 400 that is generated by the recording apparatus 100. The GUI data 400 includes the BML file for main menu 410, the BML file for program navigation 420, the BML files for replayed programs 430, the BML files for guidance 440, the BML file for programming of recording 450, and a plurality of still image files that are related to the BML files for replayed programs 430. Each of these BML files is put into graphics by the BML browser of the display device 20 and displayed by OSD.

The BML file for main menu 410 is a BML file that displays a menu for each GUI screen provided by the recording apparatus 100, and in which a main menu for performing operations on a program being recorded or replayed is written in BML. The BML file for main menu 410 is a BML file that is for the initial display in accordance with the digital broadcast standard and in which a screen to bed is played on the display device 20 initially when a user pushed the D button on the remote controller 30 is described.

The BML file for program navigation 420 is a BML file that describes, in BML, a program navigation screen for selecting a target program in order to manage or replay the programs recorded onto the recording medium 130.

The BML files for replayed programs 430 are BML files in each of which a replay-program screen for performing operations to replay a different one of the programs recorded on the recording medium 130 is described in BML. The BML files for replayed programs 430 are made up of as many BML files as the programs being recorded on the recording medium 130.

The BML files for guidance 440 are BML files in each of which the guidance screen that explains how to operate a GUI screen is described in BML. The BML files for guidance 440 includes four BML files that correspond to a main menu screen for calling a guidance screen, a program navigation screen, a replay-program screen, a recording-programming screen, respectively.

The BML file for programming of recording 450 is a BML file in which a recording-programming screen for managing programming of program recordings is described in BML.

The following shows an example of how a BML file for replayed programs 430 is described, as an example of BML files for GUI. FIG. 7 is an example of description in the BML files for replayed programs 430.

The description section 1 describes the display positions on the screen of the objects to be displayed in the replay-program screen, the background color, and the display style of the key operations to be received.

The description section 2 describes the actions corresponding to the key operations in the replay-program screen and includes the description sections 3 and 4. The description section 3 describes the issuing action of an AVC command that instructs a replay. The description section 4 describes the issuing action of an AVC command that instructs a halt.

The description section 5 describes the objects to be actually displayed. As additional information the control of the shifts to a BML file is described with the use of an anchor element used in the normal markup language.

6. GUI

The following explains the structure of and how to operate the GUI described in BML by the recording apparatus 100. It should be noted that information actually generated by the recording apparatus 100 is BML files that are described in BML; however, in the present application, explanation is provided with reference to an example of a screen in which the information is put into graphics by the BML browser.

The GUI of the recording apparatus 100 has a structure in which a plurality of screens are linked with one another. When a user pushes the D button on the remote controller 30, the main menu screen 510 shown in FIG. 8 will be displayed on the display device 20.

Main Menu Screen

FIG. 8 shows an example of a main menu screen 510 in which a BML file for main menu 410 has been put into graphics.

The main menu screen 510 is a screen in which a BML file for main menu 410 has been put into graphics, and shows a function mode information displaying section 510*a* indicating the operational state of the recording apparatus 100, an index screen displaying section 510*b*, an operational menu displaying section 510*c*, a record/replay mode information displaying section 510*d*, and a menu displaying section 510*e* that includes a program navigation menu, a recording-programming menu, a data broadcast menu, and a HELP menu.

In this screen, one of the menus in the operational menu displaying section 510*c* and in the menu displaying section 510*e* is highlighted. When either the RIGHT button or the LEFT button on the remote controller 30 is pushed, one of the operational menu displaying section 510*c* and the menu displaying section 510*e* is selected as an operation target. When either the UP button or the DOWN button on the remote controller 30 is pushed, the highlight will be shifted to a menu positioned either above or below the operation target. When a menu is not highlighted, the background color is green, and when a menu is highlighted, the background color changes to yellow.

The function mode information displaying section 510*a* indicates the current operational state of the recording apparatus 100 by displaying "RECORDING" or "REPLAYING" to show that the recording apparatus 100 is currently recording or replaying.

The index screen displaying section 510*b* is an area that shows the video image of the video PES 310 which had been displayed on the screen of the display device 20 before the D button was pushed. When the current operational state of the recording apparatus 100 is replaying, the image being replayed is displayed in the index screen displaying section 510*b*. When the current operational state of the recording apparatus 100 is recording or standing by, the image on the selected channel is displayed in the index screen displaying section 510*b*.

The operational menu displaying section 510*c* includes are cord operational menu, a halt operational menu, a fast forward operational menu, a replay operational menu, and a rewind operational menu.

The record operational menu is a menu that receives an operation to instruct that the channel shown in the index screen displaying section 510*b* (the TS outputted by the recording apparatus 100) should be recorded when the operational state of the recording apparatus 100 is standing by. When a user pushes the CONFIRM button on the remote controller 30 while this menu is highlighted, an AVC command that instructs recording of the channel being displayed will be transmitted from the display device 20 to the recording apparatus 100. Alternatively, when the operational state of the recording apparatus 100 is either recording or replaying, the background color of this menu is gray and this menu cannot be highlighted. Hereafter, when a menu is in a state where it cannot be highlighted, it will be referred to as being "a gray menu".

The halt operational menu is a menu that receives an operation to instruct that the recording or replay should be stopped when the operational state of the recording apparatus 100 is either recording or replaying. When a user pushes the CONFIRM button on the remote controller 30 while this menu is highlighted, an AVC command that instructs a halt of the operation will be transmitted from the display device 20 to the recording apparatus 100. Alternatively, when the operational state of the recording apparatus 100 is standing by, the menu is shown as a gray menu.

The fast forward operational menu and the rewind operational menu are each a menu that receives an operation to instruct that the replay target program should be forwarded or rewound when the operational state of the recording apparatus 100 is replaying. When a user pushes the CONFIRM button on the remote controller 30 while one of the fast forward operational menu and the rewind operational menu is highlighted, a respective corresponding AVC command will be transmitted from the display device 20 to the recording apparatus 100. When the operational state of the recording apparatus 100 is other than replaying, the menu is shown as a gray menu.

The replay operational menu is a menu that receives an operation to instruct that the program being replayed in a special manner (i. e. fast forwarding replay or rewinding replay) as a result of an operation on the fast forward optional menu or the rewind operational menu should be replayed in a normal manner. When a user pushes the CONFIRM button on the remote controller 30 while this menu is highlighted, an AVC command that instructs replay will be transmitted from the display device 20 to the recording apparatus 100. When the operational state of the recording apparatus 100 is other than replaying, the menu is shown as a gray menu.

Figure 9:
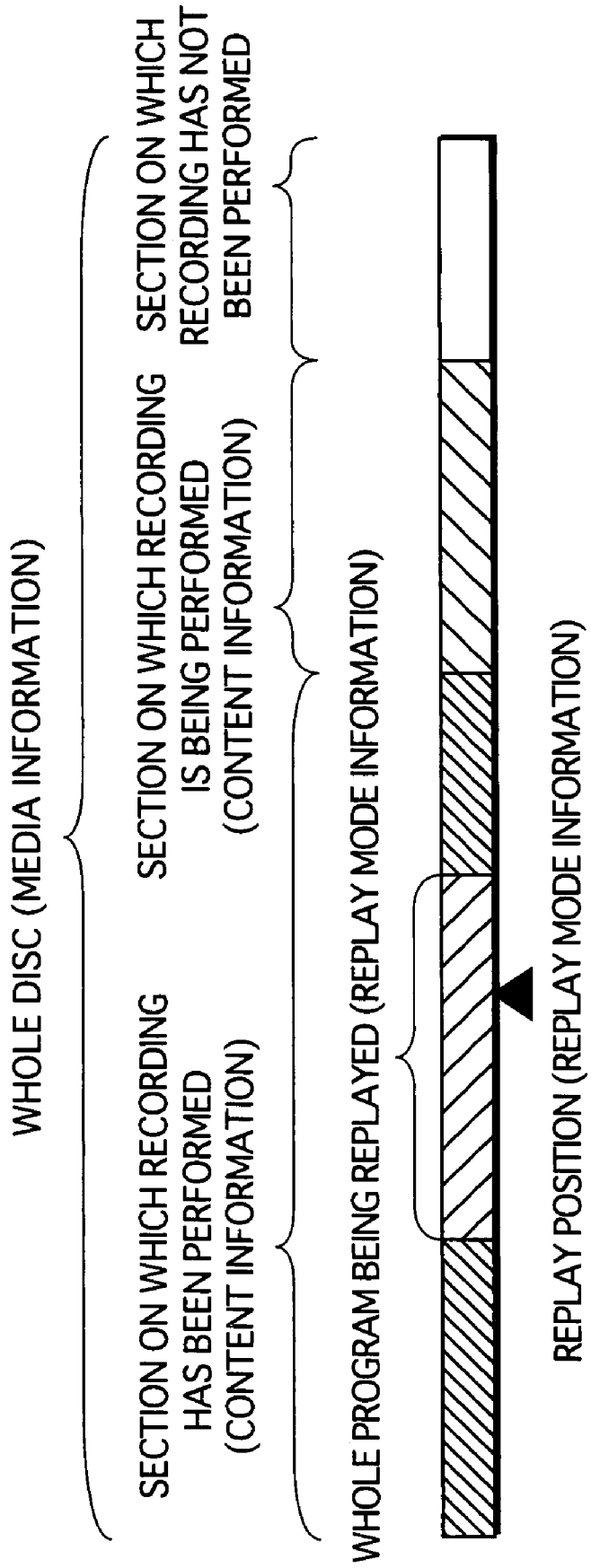
FIG. 9 shows the details of the record/replay mode information displaying section 530d.

The record/replay mode information displaying section 510*d* indicates, on the bar showing the total capacity of the recording medium 130, how much of the capacity is occupied by the program(s) having been recorded, the program currently being played, and the program currently being recorded. Additionally, when the operational state is replaying, a triangle showing the position of reading in the TS during the replay is displayed. FIG. 9 shows the details of the record/replay mode information displaying section 530*d*.

In the menu displaying section 510*e*, the program navigation menu, the recording-programming menu, and the HELP menu are link menus in each of which a hyper link to a different one of the BML file for program navigation 420, the BML file for programming of recording 450, and the BML files for guidance 440 is set. When a user pushes the CONFIRM button on the remote controller 30, the BML file to which the highlighted menu is hyperlinked will be put into graphics and displayed.

The data broadcast menu in the menu displaying section 510*e* is a link menu to the data broadcast screen. When a user pushes the CONFIRM button on the remote controller 30 while this menu is highlighted, the BML file for data broadcast to which this menu is hyperlinked will be put into graphics and displayed.

Program Navigation Screen

Figure 10:
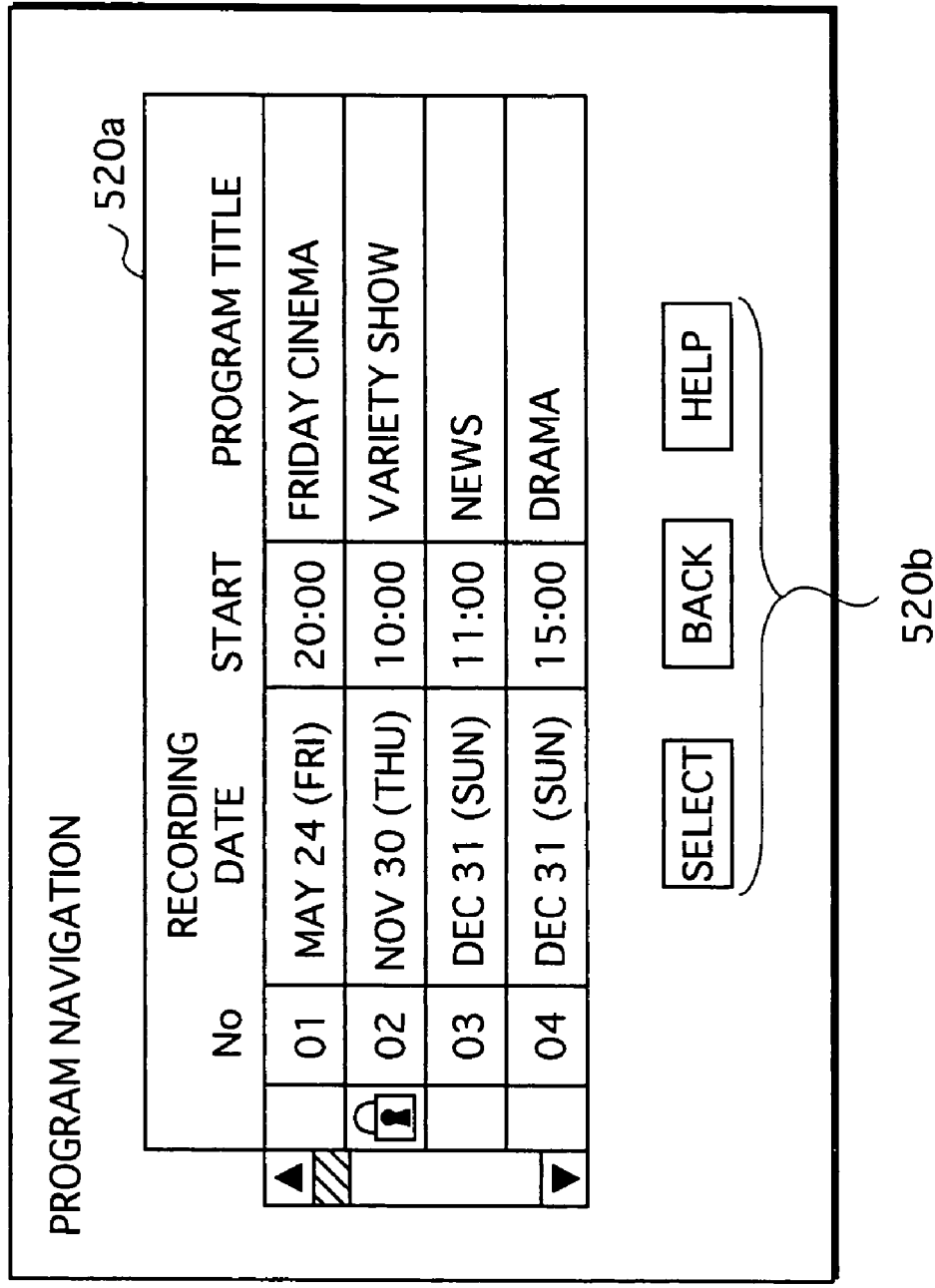
FIG. 10 shows an example of a program navigation screen 520 in which the BML file for program navigation 420 has been put into graphics.

FIG. 10 shows an example of a program navigation screen 520 in which the BML file for program navigation 420 has been put into graphics.

The program navigation screen 520 is a screen in which BML file for program navigation 420 has been put into graphics, and shows a content information list displaying section 520*a* and a menu displaying section 520*b* which includes a SELECT menu, a BACK menu, and a HELP menu.

In this screen, one of the programs displayed in the list in the content information list displaying section 520*a* and one of the menus in the menu displaying section 520*b* are highlighted. When either the UP button or the DOWN button on the remote controller 30 is pushed, the highlight on the program displayed in the list in the content information list displaying section 520*a* will be shifted upwards or downwards. When either the LEFT button or the RIGHT button on the remote controller 30 is pushed, the highlight will be shifted to the menu positioned on the left or the right. When a program or a menu is highlighted, the background color changes.

The content information list displaying section 520*a* displays, in the list, all of the programs recorded on the recording medium 130 and displays, for each of the programs, content information extracted by the apparatus information extracting unit 232.

The SELECT menu in the menu displaying section 520*b* is a link menu, and when a user pushes the CONFIRM button on the remote controller 30 while this menu is highlighted, the BML files for replayed programs 430 for the program being highlighted in the content information list displaying section 520*a* will be put into graphics and displayed. It should be noted that, in a case where a program currently being replayed is highlighted in the content information list displaying section 520*a*, when a user pushes the CONFIRM button on the remote controller 30 while this menu is highlighted, the BML file for main menu 410 will be put into graphics.

The BACK menu and the HELP menu in the menu displaying section 520*b* are link menus in which a hyperlink to the BML file for main menu 410 and a hyperlink to the BML file for guidance 440 are set, respectively. When a user pushes the CONFIRM button on the remote controller 30, the BML file to which the highlighted menu is hyperlinked will be put into graphics and displayed.

Replay-Program Screen

Figure 11:
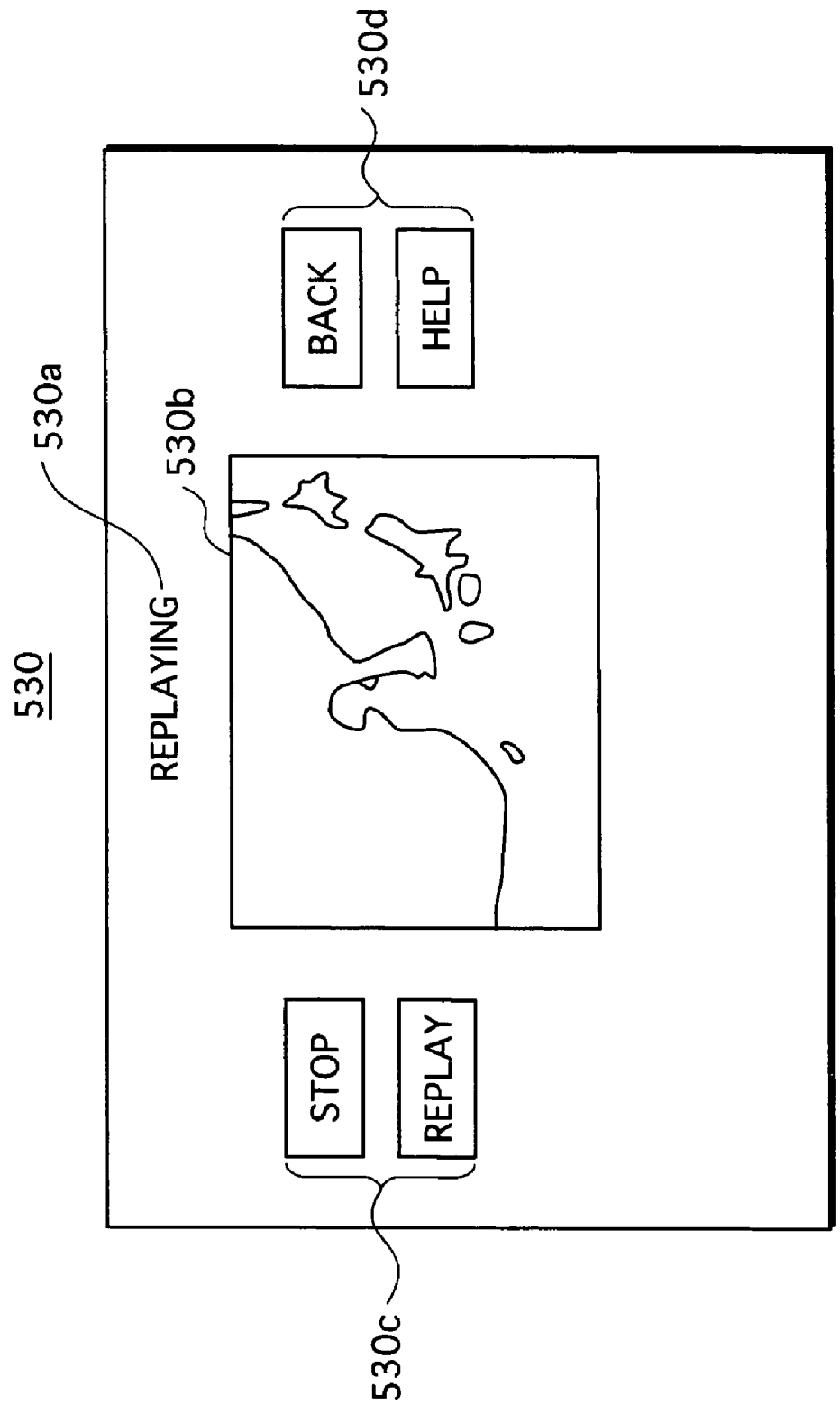
FIG. 11 shows an example of a replay-program screen 530 in which a BML file for replayed program 430 has been put into graphics.

FIG. 11 shows an example of a replay-program screen 530 in which a BML file for replayed program 430 has been put into graphics.

The replay-program screen 530 is a screen in which, among the BML files for replayed programs 430, the BML files for the program selected on the program navigation screen 520 are put into graphics. In this screen, the function mode information displaying section 530*a* which indicates the operational state of the recording apparatus 100, the index screen displaying section 530*b*, the operational menu displaying section 530*c*, and the menu displaying section 530*d*, which includes a BACK menu, and a HELP menu, are displayed.

In this screen, one of the menus in the operational menu displaying section 530*c* and in the menu displaying section 530*d* is highlighted. When either the RIGHT button or the LEFT button on the remote controller 30 is pushed, one of the operational menu displaying section 530*c* and the menu displaying section 530*d* will be selected as an operation target. When either the UP button or the DOWN button on the remote controller 30 is pushed, the highlight will be shifted to a menu positioned either above or below the operation target. When a menu is highlighted, the background color changes to yellow.

The function mode information displaying section 530*a* indicates the current operational state of the recording apparatus 100 by displaying "RECORDING" or "REPLAYING" to show that the recording apparatus 100 is currently recording or replaying.

The index screen displaying section 530b is an area that shows a still image representing a program corresponding to this screen.

The operational menu displaying section 530c includes a replay operational menu and a halt operational menu.

The replay operational menu is a menu that receives an operation to instruct that the program corresponding to the screen should be replayed. When a user pushes the CONFIRM button on the remote controller 30 while this menu is highlighted, an AVC command that instructs that the program corresponding to the screen should be replayed will be transmitted from the display device 20 to the recording apparatus 100.

The halt operational menu is a menu that receives an operation to instruct that the replay of the program corresponding to the screen should be halted. When a user pushes the CONFIRM button on the remote controller 30 while this menu is highlighted, an AVC command that instructs a halt of the operation will be transmitted from the display device 20 to the recording apparatus 100.

The BACK menu and the HELP menu in the menu displaying section 530d are link menus in which a hyperlink to the BML file for program navigation 420 and a hyperlink to the BML files for guidance 440 are set, respectively. When a user pushes the CONFIRM button on the remote controller 30, the BML file for GUI to which the highlighted menu is hyperlinked will be put into graphics and displayed.

Guidance Screen

FIG. 12 shows an example of a guidance screen 540 in which one of the BML files for guidance 440 has been put into graphics.

The guidance screen 540 is a screen in which, among the BML files for guidance 440, a BML file describing how to operate the GUI screen, from which this particular screen is called, has been put into graphics. In this screen, a text displaying portion 540a and a menu displaying portion 540b are displayed.

In this screen, when either the UP button or the DOWN button is pushed on the remote controller 30, what is displayed in the text displaying section 540a will be scrolled.

The text displaying section 540a displays in a text format how to operate a GUI screen from which this particular screen is called.

The BACK menu in the menu displaying section 540b is a link menu in which a hyperlink to the BML file describing a GUI screen from which this particular screen is called is set. When a user pushes the CONFIRM button on the remote controller 30, the BML file to which the menu is hyperlinked will be put into graphics and displayed.

Recording-programming Screen

Figure 13:
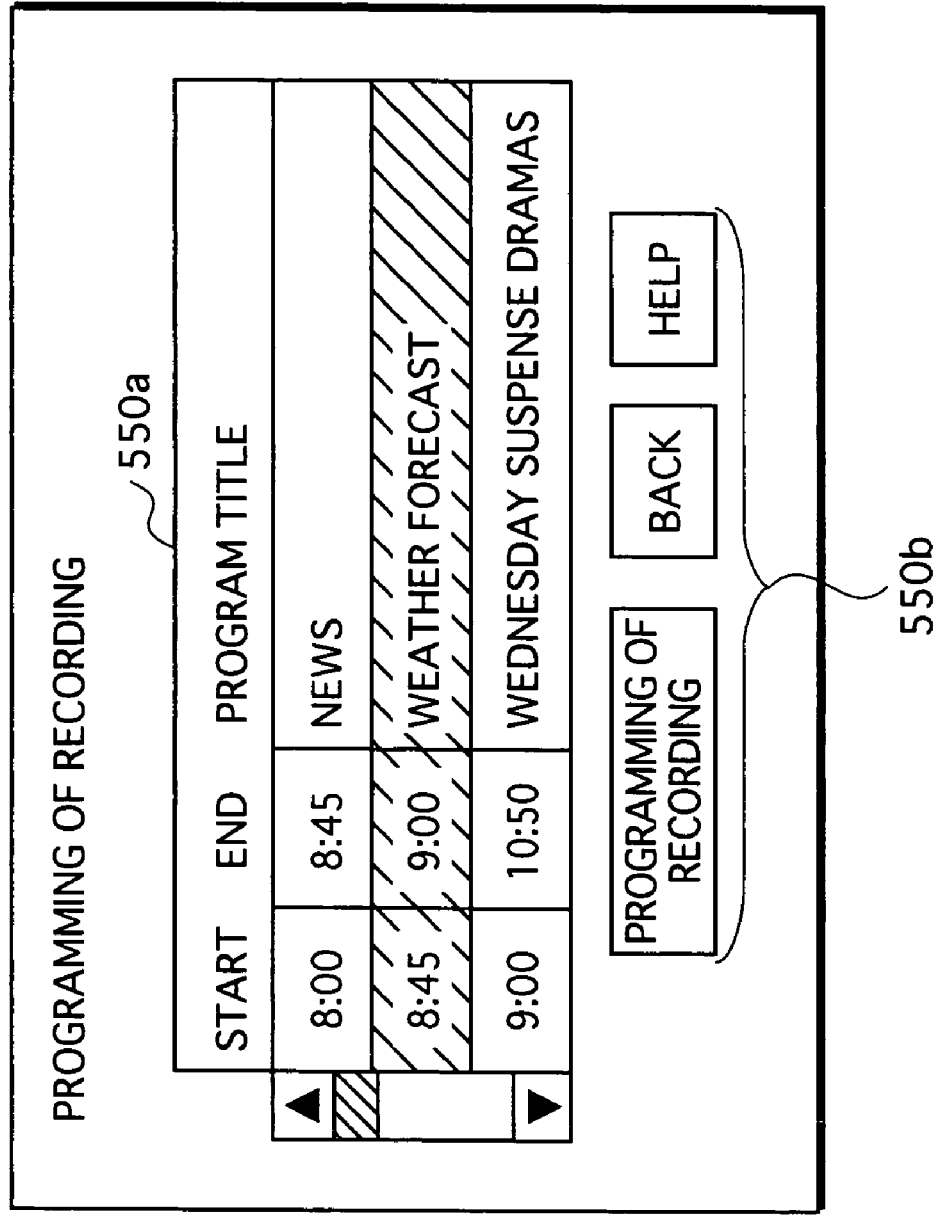
FIG. 13 shows an example of a recording-programming screen 550 in which a BML file for programming of recording 450 has been put into graphics.

FIG. 13 shows an example of a recording-programming screen 550 in which a BML file for programming of recording 450 has been put into graphics.

The recording-programming screen 550 is a screen in which a BML file for programming of recording 450 has been put into graphics and displays the program table displaying section 550a and the menu displaying section 550b, which includes a PROGRAMMING OF RECORDING menu, a BACK menu, and a HELP menu.

In this screen, one of the programs displayed in the list in the program table displaying section 550a and one of the menus in the menu displaying section 550b are highlighted. When either the UP button or the DOWN button on the remote controller 30 is pushed, the highlight on the program displayed in the list in the program table displaying section 550a will be shifted upwards or downwards. When either the LEFT button or the RIGHT button on the remote controller 30 is pushed, the highlight will be shifted to the menu positioned on the left or the right. When a program or a menu is highlighted, the background color changes.

The program table displaying section 550a displays an electronic program table created based on the program information included in TSs of digital broadcast.

The PROGRAMMING OF RECORDING menu in the menu displaying section 550b is a menu that receives an operation to instruct that recording should be programmed. When a user pushes the CONFIRM button on the remote controller 30 while this menu is highlighted, the programming of recording for the program highlighted in the program table displaying section 550a will be set.

In the menu displaying section 550b, the BACK menu and the HELP menu are link menus in which a hyperlink to the BML file for main menu 410 and a hyperlink to the BML file for guidance 440 are set, respectively. When a user pushes the CONFIRM button on the remote controller 30, the BML file to which the highlighted menu is hyperlinked will be put into graphics and displayed.

In the recording apparatus 100, each of the GUI screens mentioned above is described in BML; however, it is also acceptable to arrange the recording apparatus 100 so that, in addition to the aforementioned GUI screens, a detailed setting screen is also described in BML, in which detailed information of each of the programs recorded on the recording medium 130 will be displayed and that manages the settings for each program with respect to deletion of the program and changes in the protection setting. It is further acceptable that other screens such as a function setting screen that manages settings with respect to the operation of the recording apparatus 100 are described in BML, the settings being related to changes in the media protection setting, a choice of language to be used in the display, a choice of geographical area to be used in order to be compatible with one or more of the digital television broadcast methods that are different from country to country including the DVB (Digital Video Broadcasting).

Through the operation above using the GUI screen, it is possible to operate the recording apparatus 100 and/or the display device 20.

The following is explanation on the operation of the recording apparatus 100 and the display device 20 as a result of an operation using a GUI screen.

Figure 14:
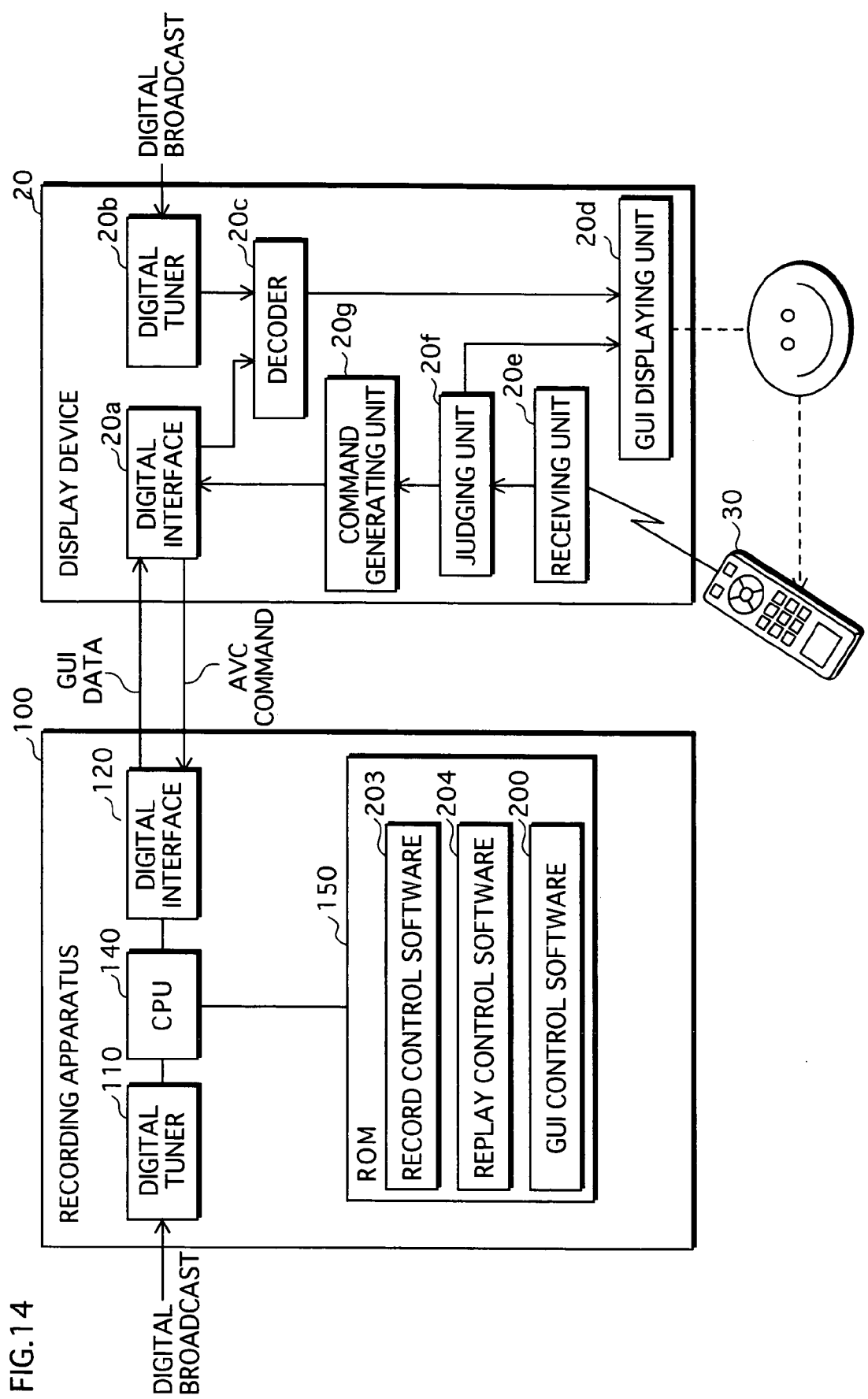
FIG. 14 is a schematic drawing that shows a transmission of an AVC command from the display device 20 to the recording apparatus 100 through an operation on the GUI screen.

FIG. 14 is a schematic drawing that shows a transmission of an AVC command from the display device 20 to the recording apparatus 100 as a result of an operation on the GUI screen.

The digital interface 20a and the digital tuner 20b in the display device 20 have the same structures as the digital interface 120 and the digital tuner 110 in the recording apparatus 100, respectively.

The decoder 20c includes (i) a TS decoder that separates a plurality of types of information (video, audio, data carousel, and so on) that are multiplexed onto a TS and (ii) an MPEG-2 decoder that decodes video and audio that have been encoded in accordance with the MPEG-2 standard.

The GUI displaying unit 20d is a functional block that is made to function by a BML browser software executed by the CPU of the display device 20 and puts the BML file accumulated in the memory into graphics.

The receiving unit 20e receives signals transmitted according to the buttons pushed on the remote controller 30.

The judging unit 20*f* and the command generating unit 20*g* are functional blocks that each are made to function by software executed by the CPU of the display device 20. The judging unit 20*f* judges the operation of which one of the recording apparatus 100 and the display device 20, the signal received by the receiving unit 20*e* instructs, by referring to the display status of the GUI screen. When the judging unit 20*f* has judged that the signal instructs the operation of the recording apparatus 100, the command generating unit 20*g* generates an AVC command for the operation.

Before the remote controller 30 is operated by the user, the display device 20 obtains TSs from one of the digital interface 20*a* and the digital tuner 20*b*, demultiplexes the TS with the use of the decoder 20*c*, replays the video and audio that have been multiplexed, as well as outputs the multiplexed BML file to the memory so as to accumulate it.

After the button is pushed on the remote controller 30 by the user, the signal is transmitted from the remote controller 30 to the receiving unit 20*e*.

At this time, in a case where the signal is the one to instruct that the display device 20 should be operated, the judging unit 20*f* instructs the GUI displaying unit 20*d* to update the screen display.

For example, when it is received that the D button has been pushed by the user, and a GUI screen is not displayed, the judging unit 20*f* instructs the GUI displaying unit 20*d* to start putting the BML file into graphics; when a GUI screen is displayed, the judging unit 20*f* instructs the GUI displaying unit 20*d* to finish putting the BML file into graphics.

Further, when a GUI screen is displayed and it is received that one of the UP, DOWN, LEFT, and RIGHT buttons is pushed, the judging unit 20*f* instructs the GUI displaying unit 20*d* to shift the highlight. When a link menu with which a hyper link to another GUI screen is set is highlighted and it is received that a CONFIRM button is pushed by the user, the judging unit 20*f* instructs the GUI displaying unit 20*d* to put the BML file being a link destination into graphics.

On the other hand, when the signal received by the receiving unit 20*e* is the one to instruct that the recording apparatus 100 should be operated, the judging unit 20*f* instructs the command generating unit 20*g* to generate an AVC command for the operation.

For example, when (i) the BML file for main menu 410 which has been multiplexed onto a TS by the recording apparatus 100 has been put into graphics, (ii) an operational menu such as the record operational menu or the replay operational menu is highlighted, and also (iii) it is received that the CONFIRM button is pushed by the user, the judging unit 20*f* instructs the command generating unit 20*g* to generate an AVC command for the operational menu.

The command generating unit 20*g* outputs the generated AVC command to the recording apparatus 100 via the digital interface 20*a*.

The AVC command that has been outputted from the digital interface 20*a* of the display device 20 will be inputted to the digital interface 120 of the recording apparatus 100 via the IEEE 1394 cable.

In the recording apparatus 100, the digital interface 120 notifies the CPU 140 of the user operation indicated by the AVC command, and the CPU 140 which has received the notification executes the record control software 203 or the replay control software 204, so that the operation of recording or replay is achieved. Along with that, the CPU 140 updates the BML file (GUI data 400) in accordance with the operational state of the recording apparatus 100 and multiplexes the BML file onto a TS so as to output them to the display device 20.

The display device 20 obtains a new BML file with the user of the digital interface 20*a* and the decoder 20*c*, and updates the BML file accumulated in the memory.

When the BML file being displayed has been updated, the GUI displaying unit 20*d* updates the screen display according to the new BML file.

As explained so far, by applying the present invention, when a user operates a GUI screen on the display device 20, the user is able to operate not only the display device 20 but also the recording apparatus 100. Even when the recording apparatus 100 and the display device 20 are installed in two different rooms, the user is able to operate a GUI screen on the display device 20, utilize the functions of the recording apparatus 100, and confirm the operations thereof with the updated GUI.

Operation

The following describes the operation of the recording apparatus 100 which has the structure described as above.

Figure 15:
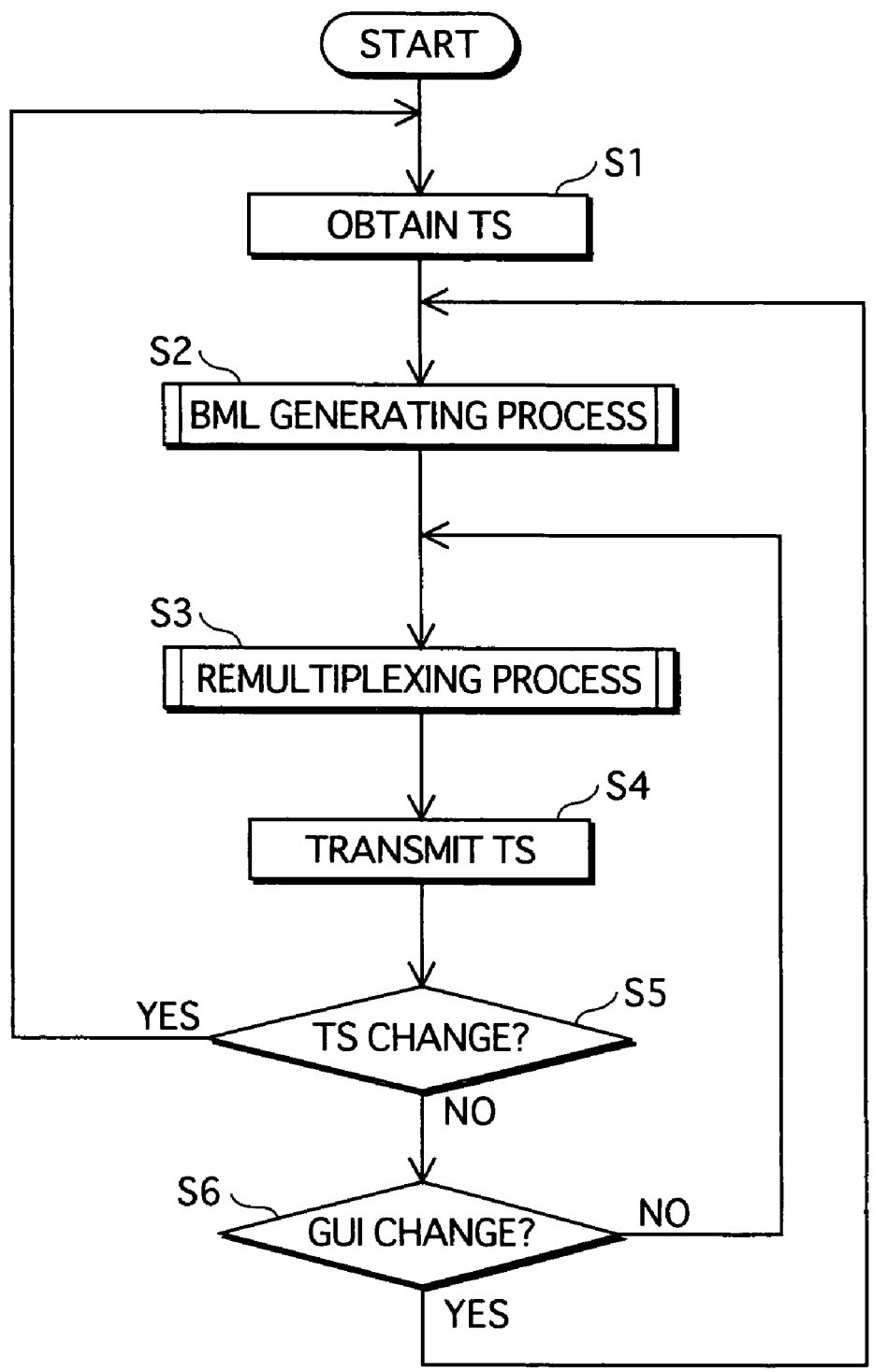
FIG. 15 is a flow chart showing the flow of the operation to control OSD of a GUI screen on the recording apparatus 100 of an embodiment of the present invention.

FIG. 15 is a flow chart showing the flow of the operation to control OSD of a GUI screen on the recording apparatus 100 of an embodiment of the present invention.

At first, the TS obtaining unit 220 in the GUI control software 200 obtains a TS for display and outputs the obtained TS to the BML generating unit 230 (S1).

According to an instruction from the controlling unit 210, the BML generating unit 230 performs BML generating process so as to generate GUI data 400 (S2).

The re-multiplexing unit 240 performs re-multiplexing process so as to re-multiplex the GUI data 400 generated by the BML generating unit 230 and the TS (S3). The multiplexed TS will be outputted to the display device 20 by the digital interface 120 (S4).

When the TS for display has been changed due to a user's operation to record, replay, or halt (S5: Yes), the TS obtaining unit 220 obtains a different TS (S1). When there is no change in the TS for display (S5: No), and one or more of the GUI screens need to be changed due to a change in the operational state of the recording apparatus 100 (S6: Yes), the BML generating unit 230 performs BML generating process so as to update the GUI data 400, according to an instruction from the controlling unit 210 (S2).

When there is no need to change the GUI screens (S6: No), the re-multiplexing unit 240 repeats the re-multiplexing process so as to re-multiplex the GUI data 400 having already been generated onto the TS (S3).

Through these processes, the GUI control software 200 is able to generate such a TS onto which the GUI data 400, which is made up of BML files that are for a plurality of GUIs and in which GUI screens are described in BML, is multiplexed.

Figure 16:
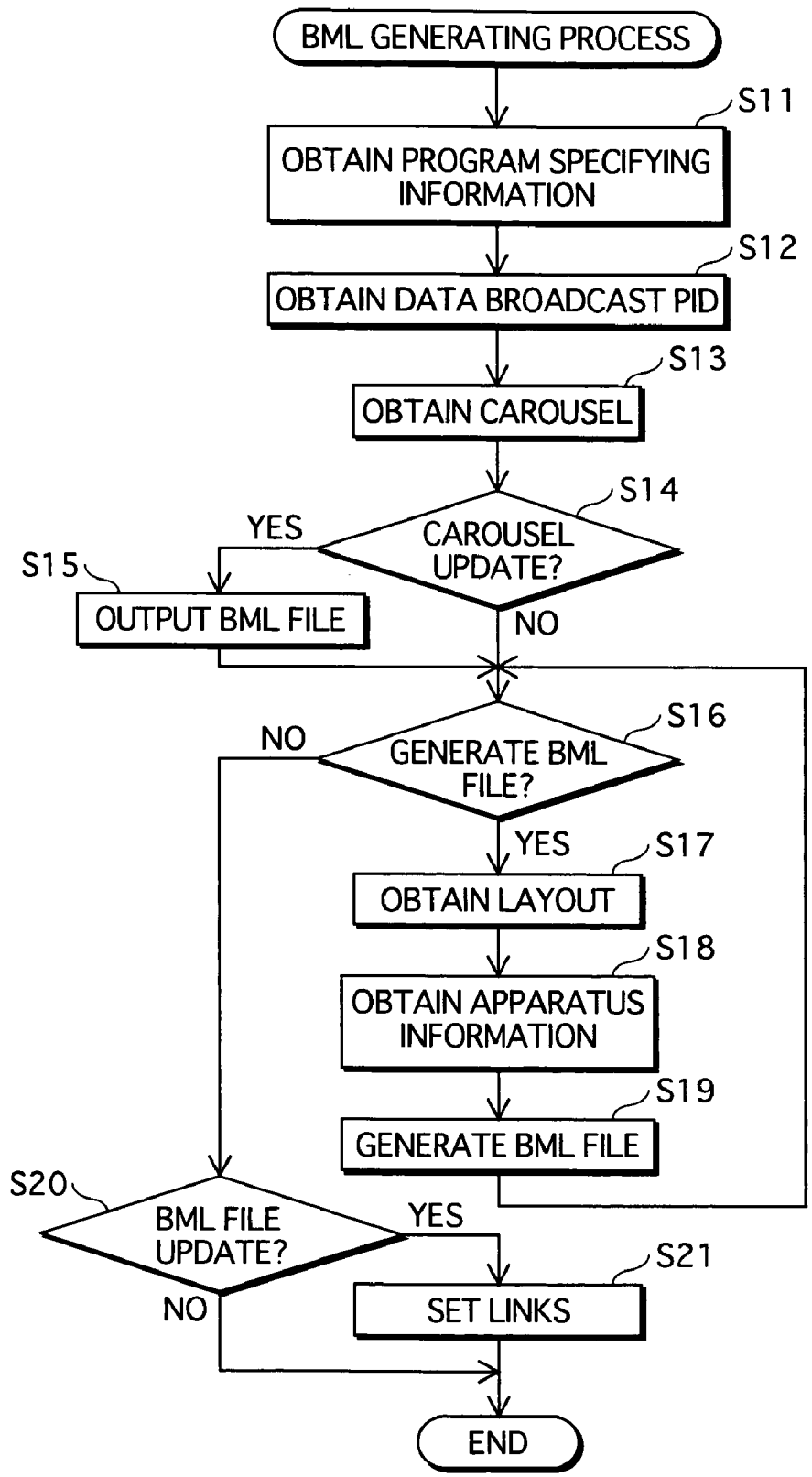
FIG. 16 shows the flow of the operation in the BML generating process performed by the BML generating unit 230.

Next, the flow of the operation in the BML generating process (S2 in FIG. 15) will be explained in details. FIG. 16 shows the flow of the operation in the BML generating process performed by the BML generating unit 230.

At first, the BML separating unit 234 obtains the value of the PID of the TS packet in which the PMT is stored, out of the PAT stored in a TS packet that is included in the first TS 300 and whose PID is "0x0000" (S11).

The BML separating unit 234 identifies which one of the TS packets in the first TS 300 stores therein the PMT, based on the obtained PID value, and obtains a value of the PID of the TS packet in which the data carousel for data broadcast 330 is stored, by referring to the PMT (S12).

The BML separating unit 234 separates all the TS packets having the PID value obtained in S12 from the first TS 300 so as to obtain the data carousel for data broadcast 330 that is stored in the separated TS packets, and outputs the intermediate TS 301 from which the TS packets are separated to the re-multiplexing unit 240 (S13). At this time, the frequency level at which TS packets storing therein the data carousel for data broadcast 330 are included in the first TS 300 is also notified to the re-multiplexing unit 240.

The BML separating unit 234 judges if the data carousel for data broad cast 330 has been updated or not, based on a parameter set on the module constituting the obtained data carousel for data broadcast 330 (S14). When it is judged that the data carousel for data broadcast 330 has been updated (S14:Yes), the BML separating unit 234 outputs the BML file for data broadcast stored in the data carousel for data broadcast 330 to the link adjusting unit 235 (S15).

When the controlling unit 210 instructs that a BML file constituting the GUI data 400 should be generated (S16:Yes), the rewriting unit 233 obtains a layout file that corresponds to the desired BML file from the layout storing unit 231 (S17), and obtains apparatus information from the apparatus information extracting unit 232 (S18). The rewriting unit 233 generates the desired BML file from the layout file and the apparatus information that have been obtained above, and outputs the generated BML file to the link adjusting unit 235 (S19).

When the controlling unit 210 further instructs that another BML file constituting the GUI data 400 should be generated (S16:Yes), the rewriting unit 233 repeats the steps of S17 through S19 so as to generate the BML file as instructed.

When one or more of the BML file for data broadcast and the BML files constituting the GUI data 400 have been updated, (S20: Yes), the link adjusting unit 235 adjusts the links of the BML file for data broadcast and the GUI data 400, and outputs, to the re-multiplexing unit 240, the BML file for data broadcast and the GUI data 400 whose links have been adjusted (S21).

Through these processes, the BML generating unit 230 completes the generating process of the GUI data 400 which is made up of BML files that are for a plurality of GUIs and in which GUI screens are described in BML.

Figure 17:
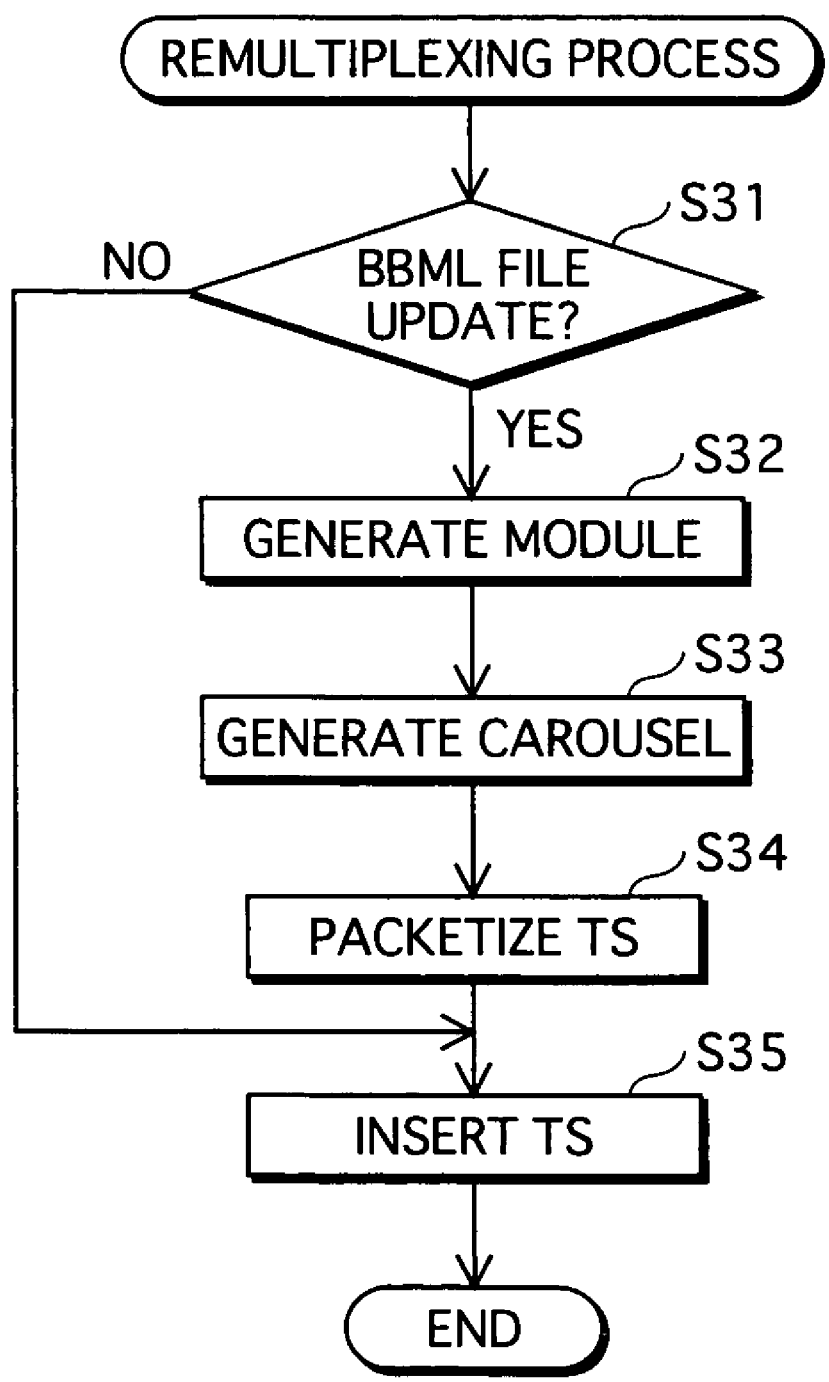
FIG. 17 shows the flow of the operation in the re-multiplexing process performed by the re-multiplexing unit 240.

The following explains in detail the flow of the operation in the re-multiplexing process (S3 in FIG. 15). FIG. 17 shows the flow of the operation in the re-multiplexing process performed by the re-multiplexing unit 240.

First, in a case where the carousel generating unit 241 has obtained the GUI data 400 and the BML file for data broadcast from the link adjusting unit 235 (S31: Yes), the carousel generating unit 241 puts the GUI data 400 and the BML file for data broadcast into a module defined by the ISO/IEC 13818-6 (S32).

The carousel generating unit 241 further generates DII that is management information of the module and generates the data carousel for GUI 331 by arranging DDB, which is the module being divided into pieces of a predetermined size (4066 bytes in the data portion), and the DII. The carousel generating unit 241 outputs the generated data carousel for GUI 331 to the TS packetizing unit 242 (S33).

The TS packetizing unit 242 packetizes the obtained data carousel for GUI 331 into a TS and stores it into the RAM 160 (S34).

The packet inserting unit 243 obtains the TS packets in which the data carousel for GUI 331 is stored from the RAM 160, and generates the second TS 302 by inserting the obtained TS packets into the intermediate TS 301 obtained form the BML separating unit 234 (S35). It should be noted that the packet inserting unit 243 inserts the TS packets in which the data carousel for GUI 331 is divided and stored into the intermediate TS 301 at the same frequency level at which TS packets in which the data carousel for data broadcast 330 is divided and stored are included in the first TS 300, the frequency level having been notified by the BML separating unit 234.

Through these processes, the re-multiplexing process by the re-multiplexing unit 240 is completed.

Second Embodiment

General Outline

In the first embodiment mentioned above, the explanation is provided on the GUI control software 200 that generates the second TS 302 in which the newly generated data carousel for GUI 331 is multiplexed at the same bandwidth at which the data carousel for data broadcast 330 is multiplexed onto the first TS 300. In the second embodiment, explanation will be provided on the GUI control software 201 that multiplexes the data carousel for GUI 331 onto a TS at a wider bandwidth, with the use of null packets included in the TS.

Structure

Figure 18:
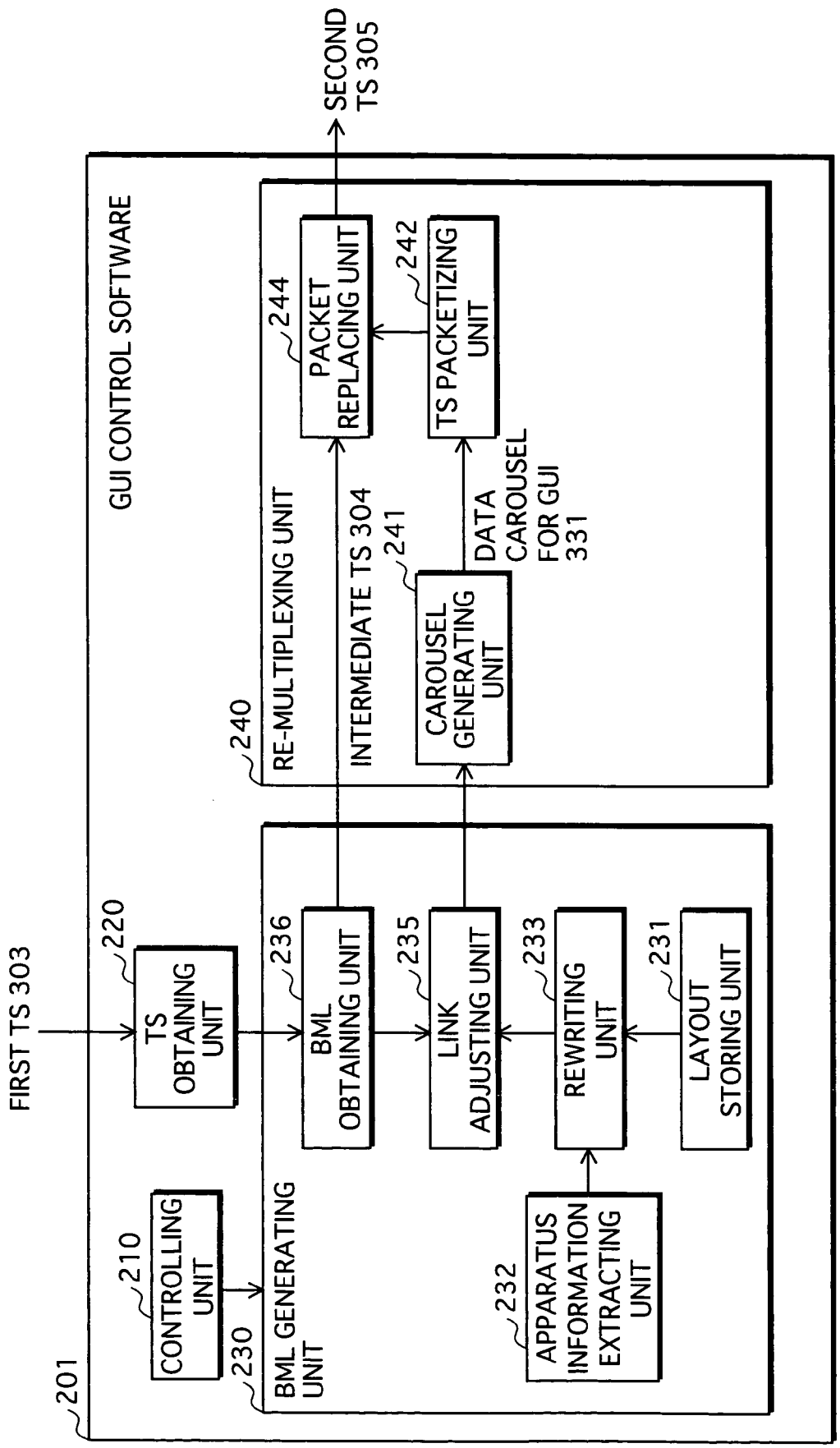
FIG. 18 is a block diagram that shows the functional structure of the GUI control software 201.

FIG. 18 is a block diagram that shows the functional structure of the GUI control software 201. In the GUI control software 201 shown in FIG. 18, compared to the GUI control software 200 explained in the first embodiment, the BML separating unit 234 is changed to the BML obtaining unit 236, and the packet inserting unit 243 is changed to the packet replacing unit 244. The constituting elements that are commonly included in the GUI control software 200 have the same reference numbers, and explanation for those will be omitted.

Figure 19A:
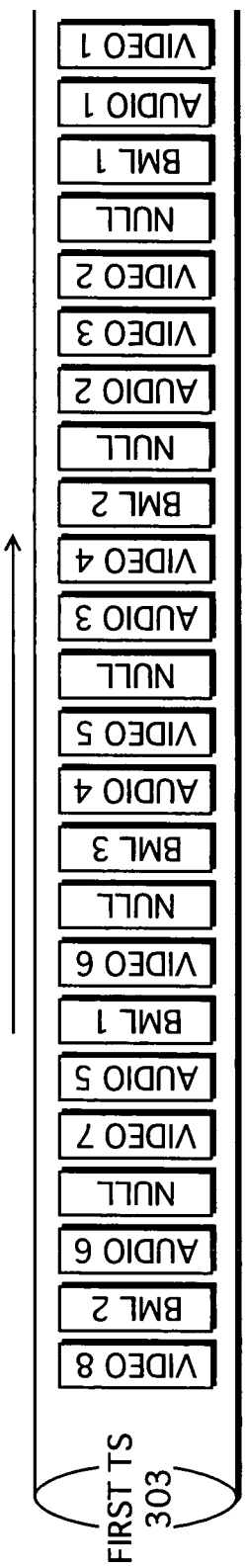
FIGS. 19A, 19B, and 19C are schematic drawings of a TS that includes null packets.

The BML obtaining unit 236 obtains, out of the first TS 303 obtained from the TS obtaining unit 220 and shown in FIG. 19A, TS packets (BMLs 1 through 3) in which the data carousel for data broadcast 330 is stored, and obtains, out of these TS packets, BML file for data broadcast in which a data broadcast content is described. When there is any change in the module ID and the module version set to the module in the data carousel for data broadcast 330, the BML obtaining unit 236 outputs the obtained BML file for data broadcast to the link adjusting unit 235.

Figure 19B:
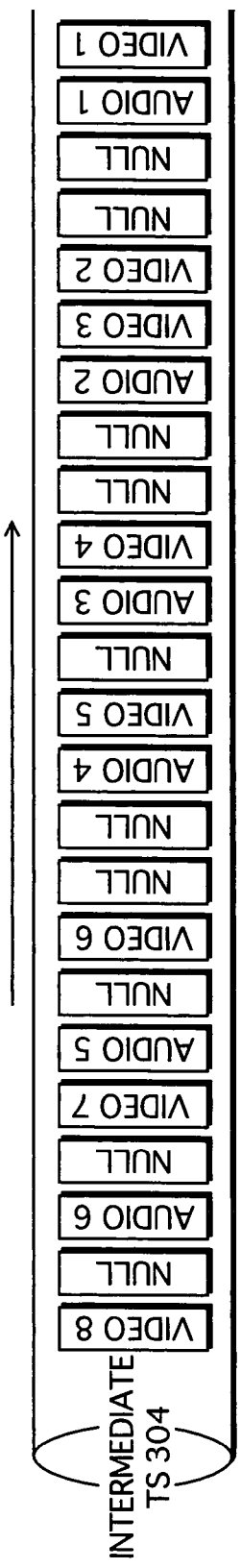

Further, the BML obtaining unit 236 converts the first TS 303 into the intermediate TS 304 shown in FIG. 19B, by changing the PID values in all the TS packets in which the data carousel for data broadcast 330 included in the first TS 303 is stored to "0x1FFF" which indicates the packet is a null packet, and outputs the intermediate TS 304 to the re-multiplexing unit 240.

Figure 19C:
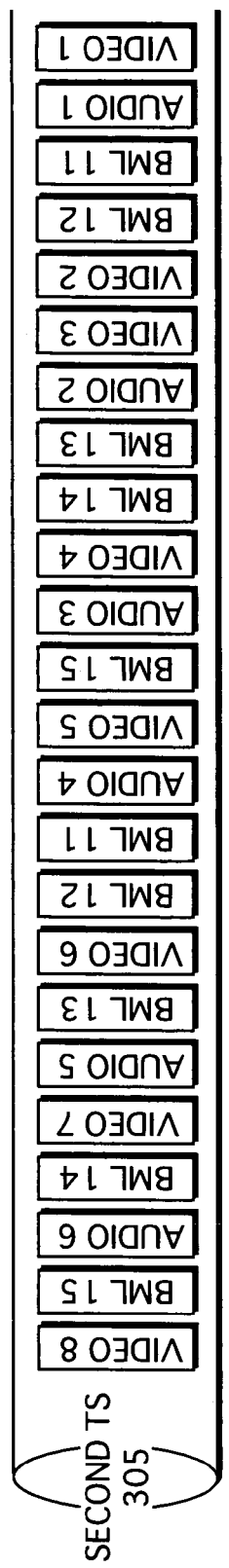

FIGS. 19A, 19B, and 19C are schematic drawings of a TS that includes null packets. In the first TS 303 shown in FIG. 19A, since the amount of information to be transported (video, audio, and data broadcast) is smaller than a predetermined amount, the transport speed of the information is adjusted by adding null packets to the TS packets in the TS. Null packets are TS packets that do not transport information, and the PID value of a null packet is set as "0x1FFF". The adjustment of the transport speed of TSs with the use of such null packets is made by a broadcast station that broadcasts the first TS 303.

The packet replacing unit 244 obtains the TS packets (BMLs 11 through 15) in which the data carousel for GUI 331 is divided and stored from the RAM 160, and replaces these obtained TS with null packets included in the intermediate TS 304 obtained from the BML obtaining unit 236, so as to generate the second TS 305 shown in FIG. 19C. The generated second TS 305 transports the video PES 310, the audio PES 320, the data carousel for GUI 331, and program identifying information.

With this structure, the GUI control software 201 is able to generate the second TS 305 onto which the data carousel for GUI 331 is multiplexed at a bandwidth wider than the one at which the data carousel for data broadcast 330 is multiplexed onto the first TS 303, without exceeding the bandwidth at which the transport stream, as a whole, is able to transport information.

Operation

The following explains the flow of the operation in the BML generating process and there-multiplexing process performed by the GUI control software 201.

Figure 20:
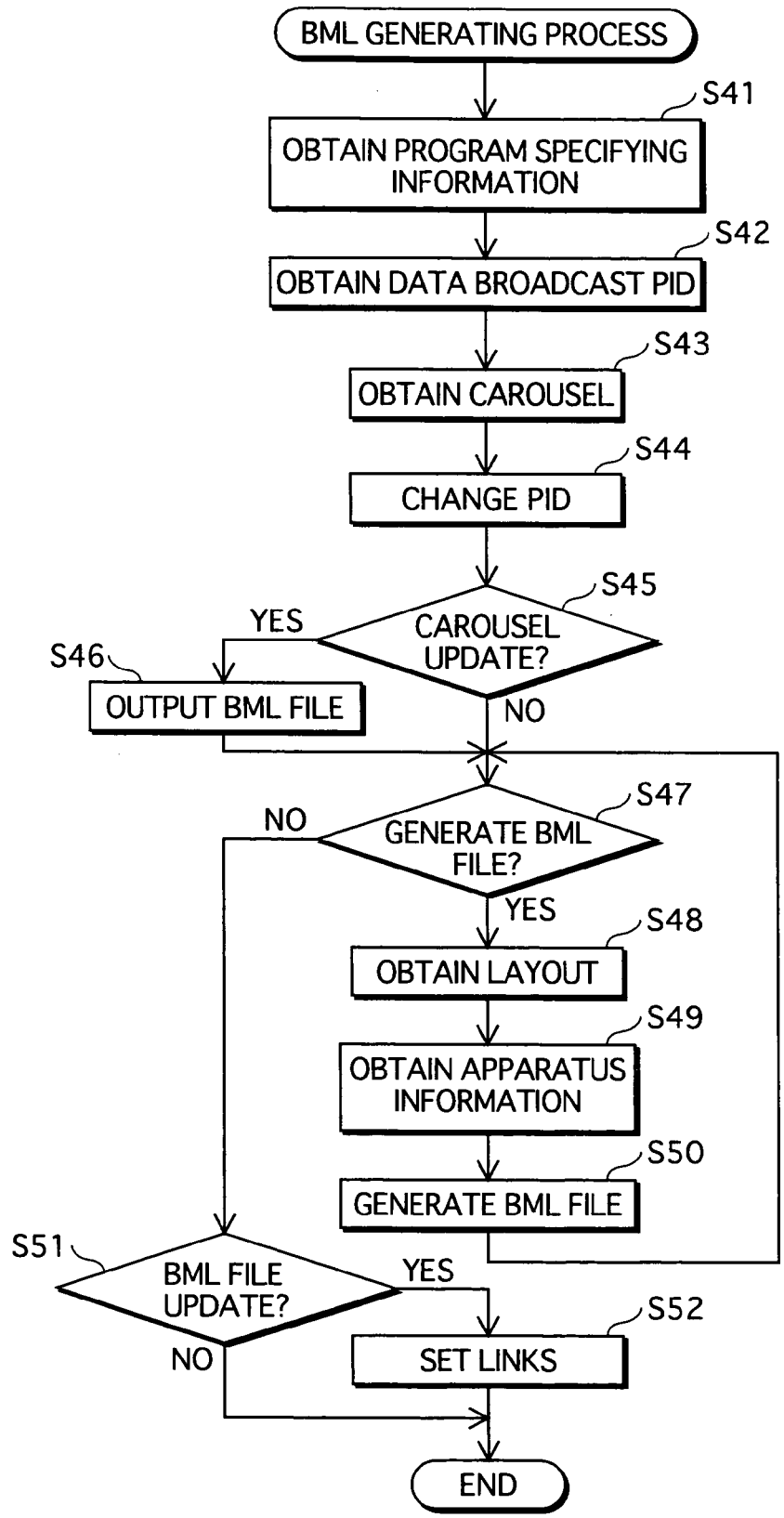
FIG. 20 shows the flow of the operation in the BML generating process performed by the BML generating unit 230.

FIG. 20 shows the flow of the operation in the BML generating process performed by the BML generating unit 230.

In the following section, explanation will be omitted as to the operation which is the same as the operation in the BML generating process performed by the GUI control software 200 shown in FIG. 16, and explanation will be provided on the operation up to the steps (S16 in FIG. 16, S47 in FIG. 20) where the rewriting unit 233 judges if the control unit 210 instructs that BML should be generated.

First, the BML obtaining unit 236 obtains the value of the PID of the TS packet in which the PMT is stored, out of the PAT stored in a TS packet that is included in the first TS 303 and whose PID is "0x0000" (S41). The BML separating unit 236 identifies which one of the TS packets in the first TS 303 stores therein the PMT, based on the obtained PID value, and obtains a PID value of the TS packets in which the data carousel for data broadcast 330 is stored, by referring to the PMT (S42). The BML separating unit 236 identifies all the TS packets having the PID value obtained in S42 from the first TS 303 so as to reconstruct the data carousel for data broadcast 330 from the information divided and stored in the payloads of the identified TS packets. (S43). The BML obtaining unit 236 changes the PIDs of all the TS packets identified in S43 to "0x1FFF" and outputs the intermediate TS 304 after the change to the re-multiplexing unit 240 (S44).

The BML obtaining unit 236 judges if the BML file for data broadcast in the module has been updated or not, based on a parameter set on the module constituting the data carousel for data broadcast 330 obtained in S43 (S45). When it is judged that the BML file for data broadcast has been updated (S45: Yes), the BML separating unit 236 outputs the BML file for data broadcast to the link adjusting unit 235 (S46).

Hereafter, the operation is performed in the same flow as the one shown in S16 and later in FIG. 16, and the BML generating process will be completed.

The following describes the flow of the operation in the re-multiplexing process.

Figure 21:
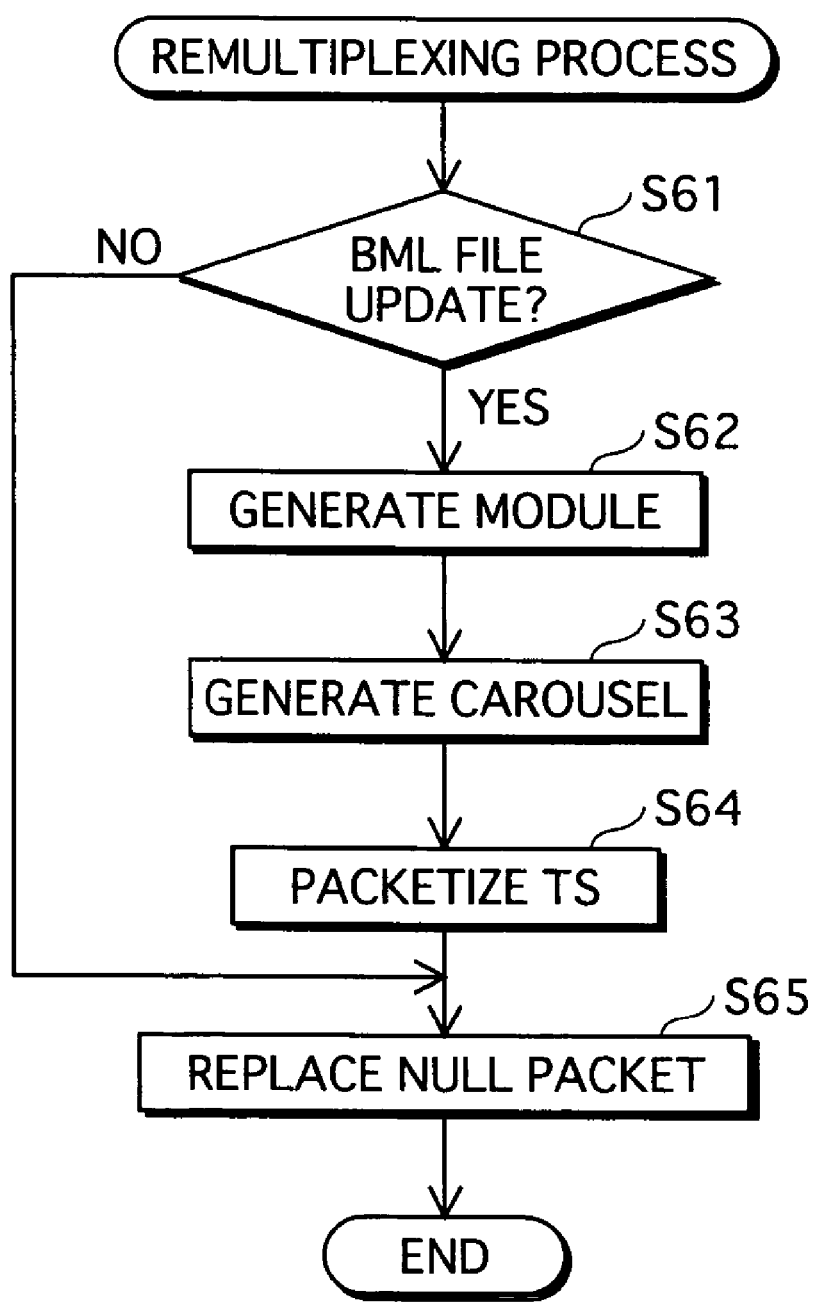
FIG. 21 shows the flow of the operation in the re-multiplexing process performed by the re-multiplexing unit 240.

FIG. 21 shows the flow of the operation in the re-multiplexing process performed by the re-multiplexing unit 240.

In the following section, explanation will be omitted as to the operation which is the same as the operation in the re-multiplexing process performed by the GUI control software 200 shown in FIG. 17, and explanation will be provided on the operation in and after the steps (S34 in FIG. 17, S64 in FIG. 21) where the TS packetizing unit 242 packetizes the data carousel for GUI 331 into a TS.

At the carousel generating unit 241, when there is no update of the GUI data 400 and the BML file for data broadcast from the link adjusting unit 235 (S61: No), or after the TS packetizing unit 242 has packetized the data carousel for GUI 331 into a TS (S64), the packet replacing unit 244 obtains TS packets into which the data carousel for GUI 331 is stored from the RAM 160, and replaces the obtained TS packets with the null packets included in the intermediate TS 304 obtained from the BML obtaining unit 236, so as to generate the second TS 305 (S65)

Through these processes, the re-multiplexing process is completed.

Third Embodiment

General Outline

In the first and second embodiments mentioned above, the explanation is provided on the GUI control software 200 that outputs such a TS onto which both the BML file for data broadcast and the GUI data 400 are multiplexed. In the third embodiment, explanation will be provided on the GUI control software 202 that outputs such a TS in which data broadcast is not included.

Structure

Figure 22:
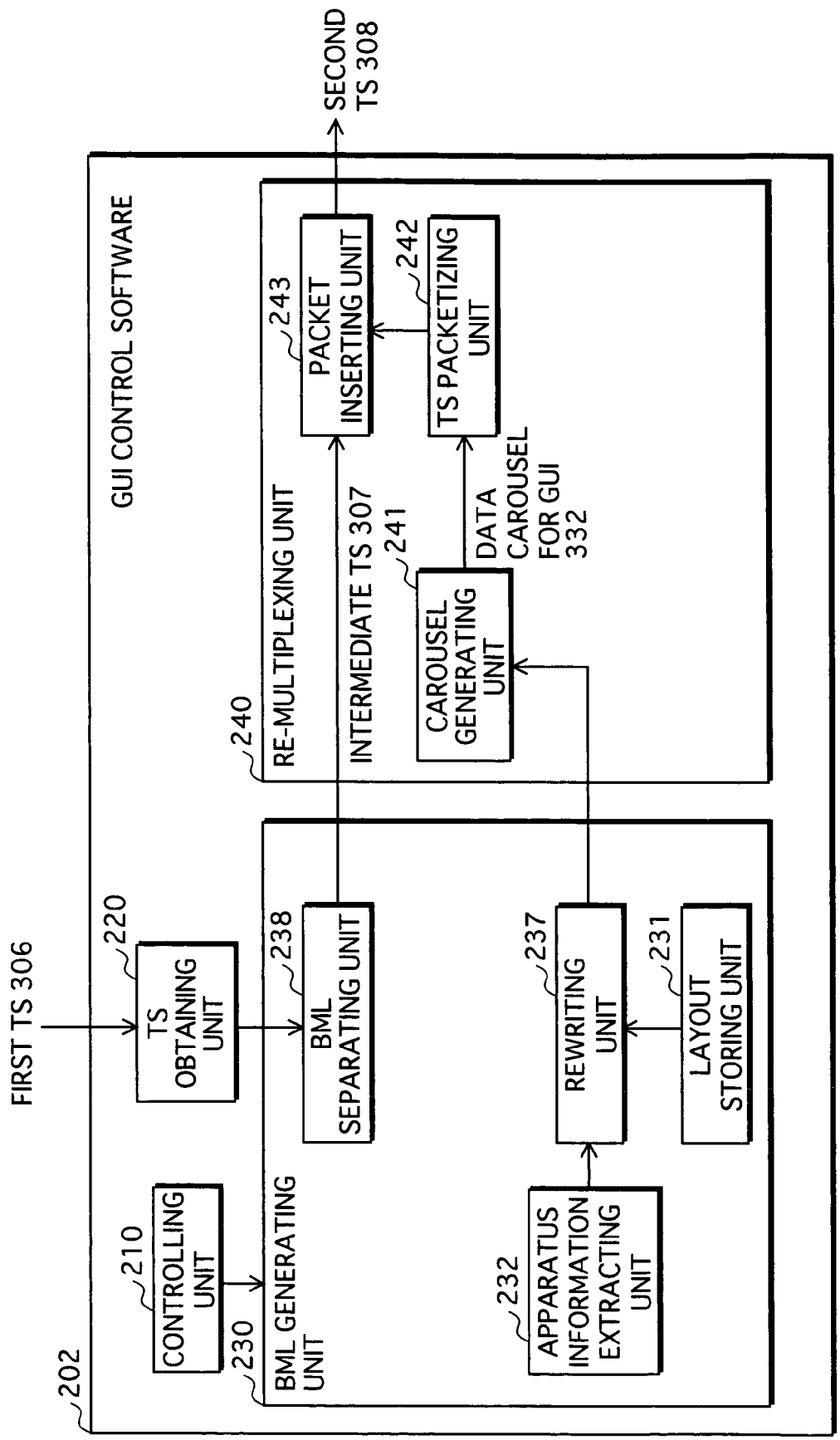
FIG. 22 is a block diagram that shows the functional structure of the GUI control software 202.

FIG. 22 is a block diagram that shows the functional structure of the GUI control software 202. In the GUI control software 202 shown in FIG. 22, compared to the GUI control software 200 explained in the first embodiment, the rewriting unit 233 is changed to the rewriting unit 237, and the BML separating unit 234 is changed to the BML separating unit 238, and the link adjusting unit 235 is removed. The constituting elements that are commonly included in the GUI control software 200 have the same reference numbers, and explanation for those will be omitted.

The rewriting unit 237 has the same function as the rewriting unit 233 explained in the first embodiment and outputs the generated BML file to the carousel generating unit 241. It should be noted that, when the apparatus information includes a still image file that is related to the generated BML file, the still image file is also outputted to the carousel generating unit 241 along with the BML file generated.

The BML separating unit 238 separates TS packets storing therein the data carousel for data broadcast 330 from the first TS 306 obtained from the TS obtaining unit 220. After the separation, the TS packets storing therein the data carousel for data broadcast 330 are revoked, and the intermediate TS 307 which transports the video PES 310, the audio PES 320, and the program specifying information is outputted to the re-multiplexing unit 240. At the same time, the frequency level at which the TS packets storing therein the data carousel for data broadcast 330 are included in the first TS 306 is notified to the re-multiplexing unit 240.

With the arrangements mentioned above, the GUI control software 202 is able to generate the second TS 308 onto which data broadcast is not multiplexed. The data carousel for GUI 332 multiplexed onto the second TS 308 has a shorter carousel cycle than the data carousel for GUI 331 in the first and second embodiments because the BML file for data broadcast is not included. Thus, it is possible to improve the response of an update of a GUI screen, which is required when the operational state of the recording apparatus 100 shifts.

Fourth Embodiment

In the first, second, and third embodiments of the present invention, a digital TV according to the digital broadcast standard defined by the ARIB is used as a display device, and BML, which is used to describe the data broadcast contents according to this standard, is used as the language in which the state information is described; however, it is possible to apply the present invention to other digital broadcast standards besides the one defined by the ARIB.

In the fourth embodiment, explanation will be provided on a recording apparatus 101 which multiplexes, onto a transport stream, an application and state information in which the layout of the user interface screen, what is to be displayed on the user interface screen, and the like are described with a data structure that is usable in the particular application, and transmits the transport stream to a display device, such as a digital TV according to the digital broadcast standard defined by DVB in Europe, that (i) includes an application executing engine (e.g. a JAVA (registered trademark) VM) for executing applications described in a machine-independent byte code language and (ii) executes a procedural application (e. g. a JAVA (registered trademark) program) obtained from data broadcast.

Structure

1. System Structure

Figure 23:
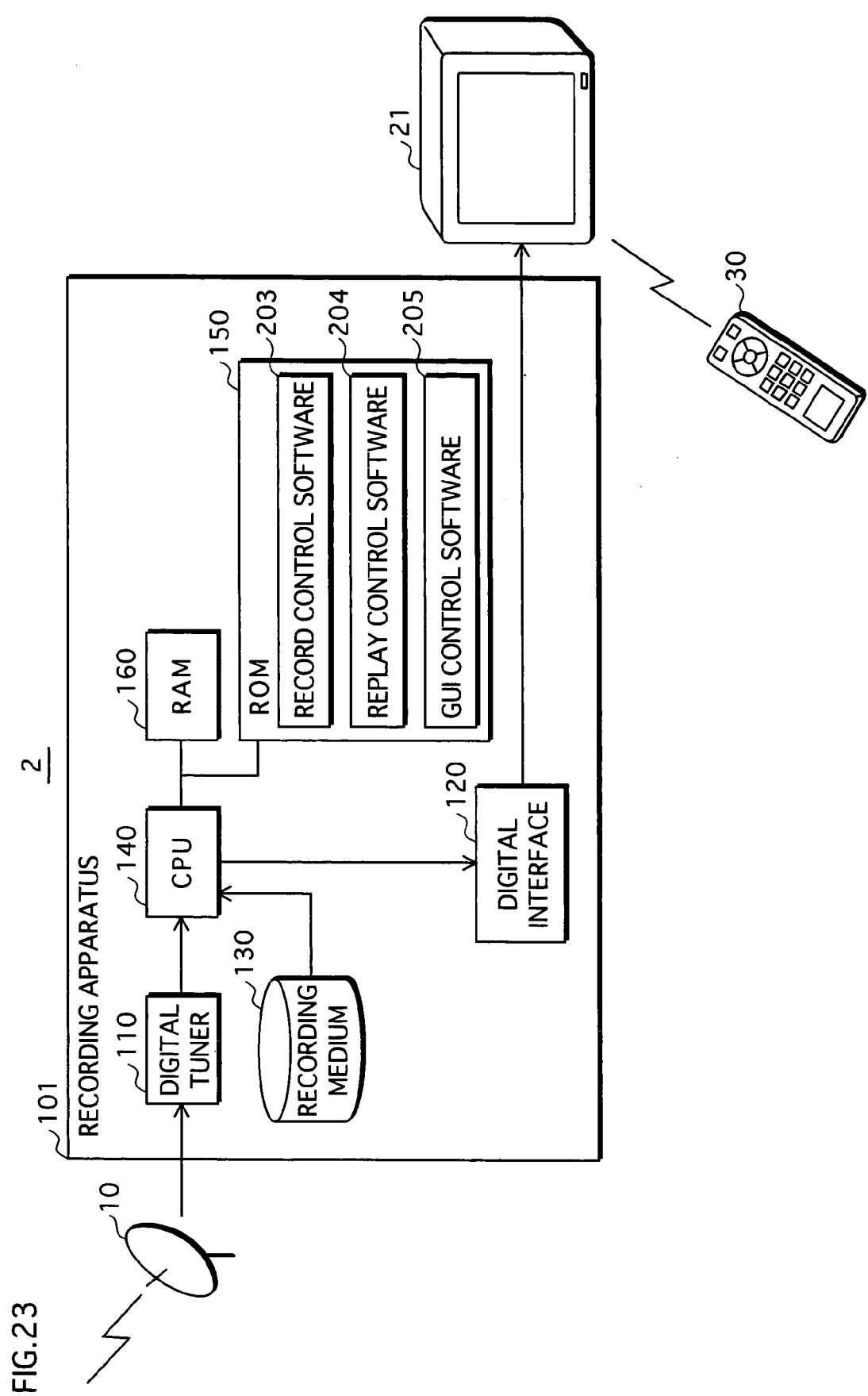
FIG. 23 shows the structure of the record/replay system 2 in which the recording apparatus 101 of the fourth embodiment is used.

FIG. 23 shows the structure of the record/replay system 2 in which the recording apparatus 101 of the fourth embodiment is used.

The record/replay system 2 records and replays digital broadcast and, compared to the record/replay system 1 explained in the first embodiment, the display device 20 is changed to the display device 21. The constituting elements that are commonly included in the record/replay system 1 have the same reference numbers, and explanation for those will be omitted.

Data broadcast is multiplexed onto the digital broadcast that is received by the antenna 10 and is according to the MHP (Multimedia Home Platform) standard. A data broadcast content according to the MHP standard is made up of an application described in a machine-independent bytecode language (hereafter, referred to as the application) and a document to be utilized by the application. Such application and document are transported in an object carousel.

The display device 21 includes an MPEG-2 decoder for offering television broadcast to a user and an application executing engine that executes the application so as to offer data broadcast according to the MHP standard to a user. Like the display device 20, the display device 21 further has a function of transmitting, to the recording apparatus 101, an AVC command for controlling the devices that are mutually connected via the IEEE 1394 cable.

2. Recording Apparatus

The recording apparatus 101 has the same hardware structure as the recording apparatus 100. The ROM 150 stores therein a GUI control software 205, instead of the GUI control software 200 explained in the first embodiment.

3. Software Structure

Figure 24:
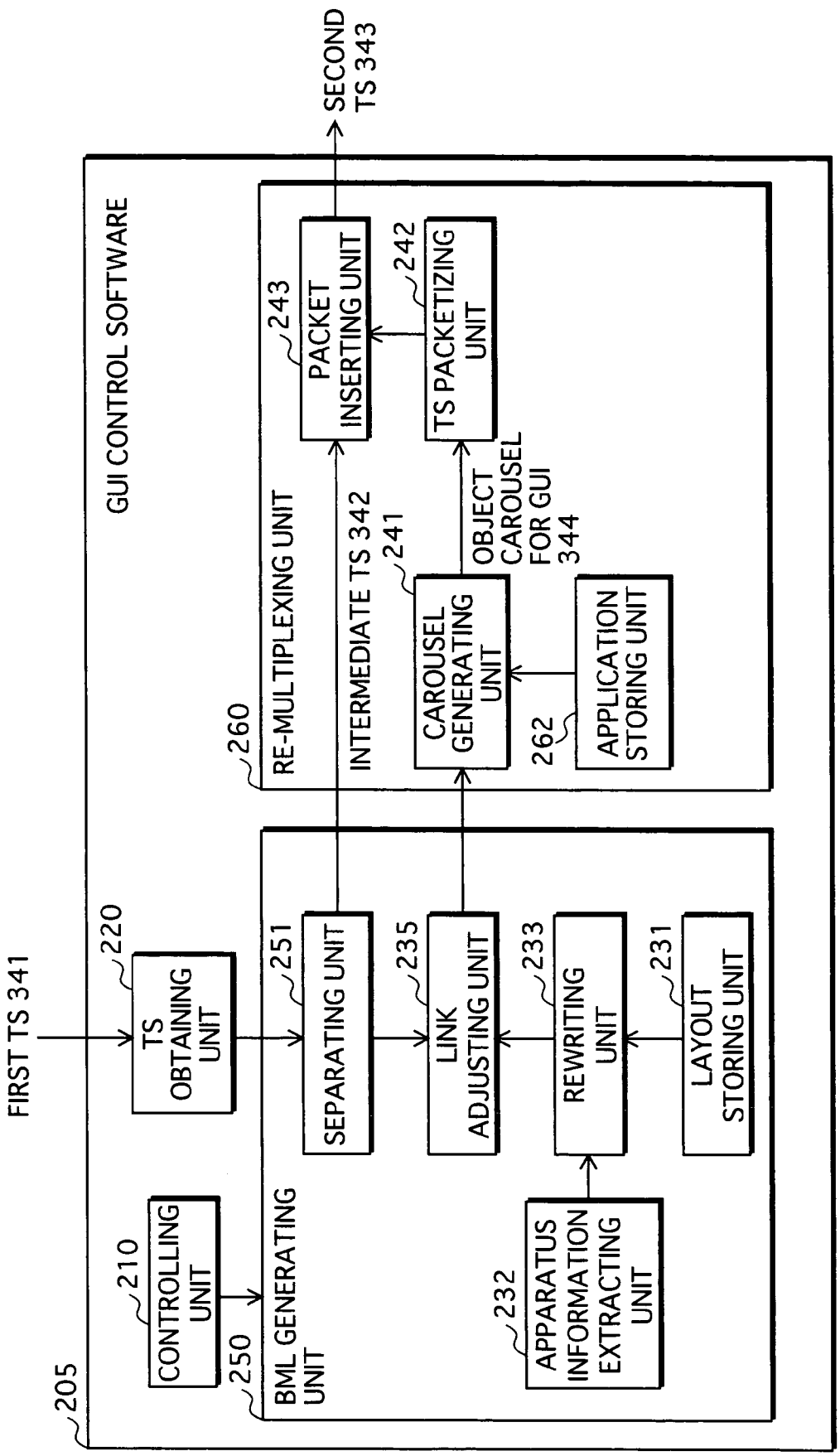
FIG. 24 is a block diagram showing the functional structure of the GUI control software 205 which controls OSD of a GUI screen.

FIG. 24 is a block diagram showing the functional structure of the GUI control software 205 which controls OSD of a GUI screen.

In the GUI control software 205, compared to the GUI control software 200 explained in the first embodiment, the BML generating unit 230 is changed to the BML generating unit 250, ad the re-multiplexing unit 240 is changed to the re-multiplexing unit 260. The constituting elements that are commonly included in the GUI control software 200 have the same reference numbers and explanation for those will be omitted.

Compared to the BML generating unit 230, in the BML generating unit 250, the BML separating unit 234 is replaced with a separating unit 251.

The separating unit 251 separates an object carousel for data broadcast from the first TS 341 obtained from the TS obtaining unit 220, in the same manner in which the BML separating unit 234 separates the data carousel for data broadcast 330 from the first TS 300. The separating unit 251 also outputs, to the re-multiplexing unit 260, the intermediate TS 342, which is the result of separating the object carousel for data broadcast from the first TS 341, as well as obtains a data broadcast content out of the object carousel for data broadcast and outputs it to the link adjusting unit 235.

Compared to the re-multiplexing unit 240, in the re-multiplexing unit 260, the carousel generating unit 241 is changed to a carousel generating unit 261, and an application storing unit 262 is added.

Every time the GUI data 400 and the data broadcast content are outputted from the BML generating unit 230, the carousel generating unit 241 generates an object carousel that transports the GUI data 400 and the content for data broadcast obtained from the BML generating unit 250. At the time of activating the recording apparatus 101, however, the carousel generating unit 241 obtains a BML browser application from the application storing unit 262 and generates an object carousel which transports the BML browser application as well in addition to the GUI data 400 and the content for data broadcast obtained form the BML generating unit 250.

The carousel generating unit 241 outputs, to the TS packetizing unit 242, the generated object carousel as the object carousel for GUI 344.

The application storing unit 262 stores therein a BML browser application described in a machine-independent bytecode language.

With the arrangements as above, the recording apparatus 101 is able to, upon its activation, transmit a BML browser application to the display device 21.

The BML browser application is executed by the application executing engine included in the display device 21. It is possible to display by OSD when the user interface describing document constituting the GUI data 400 is put into graphics by this BML browser application.

Other Modification Examples

The present invention has been explained so far according to the first through fourth embodiments; however, needless to say, the present invention is not limited to these embodiments. The following cases are also part of the present invention:

(1) The present invention may be construed as methods described as above. Alternatively, the present invention may be construed as a computer program that realizes these methods with a computer, or as digital signals from such a computer program.

(2) The present invention may be construed as a computer-readable recording medium, e. g. a flexible disk, a hard disk, a CD-ROM, an MO, a DVD, a DVD-ROM, a DVD-RAM, and a BD (Blu-ray Disc), or a semiconductor memory, onto which such a computer program or such digital signals are recorded. Alternatively, the present invention may be construed as such a computer program or such digital signals that are recorded onto a recording medium as above.

Further, the present invention may be construed as such a computer program or such digital signals that are transferred via a telecommunication line, a wireless or wired communication line, a network represented by the Internet, or the like.

Furthermore, the present invention may be construed as a computer system comprising a microprocessor and a memory wherein the memory stores therein the computer program mentioned above, and the microprocessor operates according to the computer program.

It is also acceptable to construe that such a program or such digital programs are executed on another independent computer system after being transferred by being recorded on the recording media mentioned above or being transferred via the network mentioned above.

(2) In the first embodiment, it is arranged so that the recording apparatus of the present invention receives TSs in digital broadcast via an antenna; however, in the present invention, it is acceptable to obtain TSs in other methods. For example, it is acceptable to have an arrangement wherein the recording apparatus has an external input terminal and obtains TSs outputted by another replaying apparatus or obtains TSs from a cable TV or the like. It is also acceptable that the recording apparatus of the present invention has a recording medium installed thereon and reads the TSs having been recorded on the recording medium.

(3) In the first through fourth embodiments mentioned above, explanation is provided on a recording apparatus that has a structure that transmits TSs via the digital interface. It is acceptable if the present invention has an arrangement wherein the recording apparatus has a structure that converts the video data multiplexed onto the TS into analogue video signals such as NTSC signals or PAL signals and transmits the analogue video signals via the analogue interface, so that the output of video data can be switched between analogue and digital depending on the type of the display device being connected thereto. It is also acceptable to have an arrangement wherein the recording apparatus includes, as a structure for realizing OSD, constituent elements for analogue outputs that generate video signals for conventional OSD and superimpose them onto analogue video signals, in addition to the constituent elements for digital outputs that describe GUI screens in BML and multiplex them onto a TS, so that the structure for realizing OSD can be switched between the constituent elements for digital outputs and the constituent elements for analogue outputs, depending on to which type the vide data outputs are switched.

(4) In the fourth embodiment, explanation is provided on the structure that outputs, to the display device, a BML browser and a BML file (state information); however, the procedural application to be executed by an application executing engine is not limited to a BML browser, and the state information is not limited to a BML file.

It is possible to achieve OSD display, which is an object of the present invention as long as (i) the procedural application outputted by the recording apparatus is executable by the application executing engine in the display device and is able to put into graphics, information describing a screen layout with a predetermined data structure and (ii) the state information outputted by the recording apparatus describes a user interface screen with a data structure that can be interpreted and put into graphics by the procedural application.

Additionally, the recording apparatus does not necessarily have to output the procedural application and the state information together.

In a case where the display device including an application executing engine has already stored therein a procedural application that puts information described with a predetermined data structure into graphics, it is possible for the recording apparatus of the present invention to achieve OSD by (i) describing one or both of the layout of the user interface screen and the apparatus information with a data structure that can be interpreted and put into graphics by a procedural application, and (ii) outputting the state information described to the display device.

(5) In the first through fourth embodiments, the explanation has been provided presuming that the stream data for recording broadcast programs onto a recording medium and to be outputted to a display device is stream data according to the MPEG-2 TS method; however, the features of the recording apparatus of the present invention do not depend on the characteristics of the MPEG-2 TS method. Thus, the stream data to be recorded and outputted may be of any other methods, as long as the stream data is able to transfer video data and state information.

It is acceptable, for example, that the stream data is according to the MPEG-2 PS method, or another method that is not by the MPEG standard.

(6) It is also acceptable to combine the aforementioned embodiments and modification examples.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording apparatus comprising:
an obtaining unit configured to obtain a transport stream including video data and a data broadcast content;
a receiving unit configured to receive a user's operation;
a read/write unit configured to perform a writing process of writing the transport stream to a recording medium and a reading process of reading the transport stream from the recording medium, according to the user's operation;
a separating unit configured to separate the transport stream into the data broadcast content and an intermediate transport stream that includes the video data;
a generating unit configured to, with use of a description method used for describing the data broadcast content, generate state information indicating in what state the recording apparatus is as a result of the user's operation;
a re-multiplexing unit configured to generate a new data broadcast content from the generated state information and the separated data broadcast content, and to generate a new transport stream by multiplexing the new data broadcast content and the intermediate transport stream; and
an outputting unit configured to output the new transport stream to a display device via a digital interface, wherein
the display device is configured to display graphic user interfaces;
the state information includes a control instruction to control a graphic user interface for at least receiving the user's operation, and
the description method is to describe in one of a markup language and a machine-independent bytecode language.

2. The recording apparatus of claim 1, wherein
the state information is a user interface screen description document and includes a hyper link to the data broadcast content.

3. The recording apparatus of claim 1, further comprising a link attaching unit configured to attach a hyper link to the data broadcast content, wherein
the state information is a user interface screen description document and is a link destination of the hyper link.

4. The recording apparatus of claim 1, wherein
said outputting unit outputs, to the display device, along with the state information, an application that is described in a machine-independent bytecode language and is for putting the state information into graphics.

5. The recording apparatus of claim 1, wherein said generating unit includes a storing subunit and an apparatus information extracting subunit, said storing subunit storing therein layout information in which a layout of a user interface screen is described in a markup language and said apparatus information extracting subunit being configured to obtain apparatus information indicating in what state the recording apparatus is as a result of the user's operation, and said generating unit generates the state information by obtaining the layout information from said layout storing subunit and rewriting the layout information according to the state indicated in the apparatus information.

6. The recording apparatus of claim 5, wherein the apparatus information is one of or a combination of any of (i) function mode information indicating an operational state of the recording apparatus, (ii) function operation information being an explanation on how to operate the user interface screen, (iii) media information indicating in what state the recording medium is, including a remaining recording capacity of the recording medium, (iv) content information indicating in what state the transport stream is, including an amount of transport stream data having been recorded on the recording medium, (v) replay mode information indicating a position of reading with respect to an entire length of the TS being read, and (vi) recording mode information indicating a position of writing with respect to an entire length of the TS being written.

7. The recording apparatus of claim 1, wherein said receiving unit receives operation information indicating the user's operation from the display device via the digital interface.

8. The recording apparatus of claim 1, wherein said re-multiplexing unit includes:

a content generating subunit configured to generate the new data broadcast content from the generated state information and the separated data broadcast content; and a packetizing subunit configured to, after packetizing the new data broadcast content, multiplex the new data broadcast content and the intermediate transport stream, and said packetizing subunit assigns, to packets that store therein the new data broadcast content, PIDs assigned to packets that transport the data broadcast content included in the transport stream obtained by said obtaining unit.

9. The recording apparatus of claim 8, wherein the data broadcast content is multiplexed onto the transport stream using a data carousel method, and said content generating subunit generates the new data broadcast content by adding the state information to a data carousel transporting the data broadcast content.

10. The recording apparatus of claim 9, wherein said packetizing subunit multiplexes the new data broadcast content and the intermediate transport stream at a bandwidth that is same as a bandwidth of the transport stream at a stage of being obtained by said obtaining unit.

11. The recording apparatus of claim 8, wherein said content generating subunit generates the new data broadcast content by replacing the separated data broadcast content with the state information and revoking the separated data broadcast content.

12. The recording apparatus of claim 8, wherein the transport stream obtained by said obtaining unit includes a plurality of null packets that have no information to be transported therein, and said packetizing subunit performs the multiplexing by inserting, into the intermediate transport stream, packets that transport the new data broadcast content, in positions where the packets that have transported the data broadcast content and the null packets were placed in the transport stream obtained by said obtaining unit.

13. The recording apparatus of claim 8, wherein the new transport stream into which the state information has been incorporated is recorded onto the recording medium by said read/write unit.

* * * * *